US012631746B2

(12) United States Patent
Agarwal et al.

(10) Patent No.: US 12,631,746 B2
(45) Date of Patent: May 19, 2026

(54) NON-CONTACT MICROWAVE TESTING SYSTEM AND METHOD FOR SEE-THROUGH IMAGING

(71) Applicant: WAVESCAN TECHNOLOGIES PTE. LTD., Singapore (SG)

(72) Inventors: Kush Agarwal, Singapore (SG); Karthik Thothathri, Singapore (SG)

(73) Assignee: Wavescan Technologies PTE. LTD., Singapore (SG)

( * ) Notice: Subject to any disclaimer, the term of this patent is extended or adjusted under 35 U.S.C. 154(b) by 524 days.

(21) Appl. No.: 17/926,751

(22) PCT Filed: May 21, 2021

(86) PCT No.: PCT/SG2021/050280
§ 371 (c)(1),
(2) Date: Nov. 21, 2022

(87) PCT Pub. No.: WO2021/236019
PCT Pub. Date: Nov. 25, 2021

(65) Prior Publication Data
US 2023/0243956 A1 Aug. 3, 2023

(30) Foreign Application Priority Data

May 21, 2020 (SG) ............................ 10202004777Y

(51) Int. Cl.
G01S 13/88 (2006.01)
G01S 13/86 (2006.01)
G01S 13/90 (2006.01)
(52) U.S. Cl.
CPC ............ G01S 13/887 (2013.01); G01S 13/86 (2013.01); G01S 13/90 (2013.01)

(58) Field of Classification Search
CPC ......... G01S 13/887; G01S 13/86; G01S 13/90
See application file for complete search history.

(56) References Cited

U.S. PATENT DOCUMENTS 9,595,765 B1 * 3/2017 Valayil .................... H01Q 13/18
10,067,225 B1 * 9/2018 Sentelle .................. G01S 13/32
(Continued)

FOREIGN PATENT DOCUMENTS

CN 105066630 A 11/2015
CN 106872975 A 6/2017
(Continued)

OTHER PUBLICATIONS

S. Saponara, M. S. Greco and F. Gini, "Radar-on-Chip/in-Package in Autonomous Driving Vehicles and Intelligent Transport Systems: Opportunities and Challenges," in IEEE Signal Processing Magazine, vol. 36, No. 5, pp. 71-84, Sep. 2019, doi: 10.1109/MSP.2019. 2909074. (Year: 2019).*

(Continued)

*Primary Examiner* — William Kelleher
*Assistant Examiner* — Noah Yi Min Zhu
(74) *Attorney, Agent, or Firm* — Kevin J Fournier Intellectual Property Legal Services Ltd.; Kevin J Fournier

(57) ABSTRACT

The invention describes a non-contact system and a method for a microwave-based imaging solution for non-destructive testing (NDT) and evaluation of an area under testing (AUT) of assets such as facades, cladding systems, concrete pillars, concrete walls, bridges, tunnels, and dams. The system is comprised of a combination of a various subsystems including but not exclusive to: a front-end subsystem, a system-in-package (SiP) subsystem, and a signal processing subsystem responsible for 3D imaging and detection of defects of the asset.

15 Claims, 17 Drawing Sheets

(56) References Cited

U.S. PATENT DOCUMENTS

| | | | | |
|---|---|---|---|---|
| 2005/0128125 A1* | 6/2005 | Li | ............................ | G01V 3/15 |
| | | | | 324/326 |
| 2009/0237092 A1 | 9/2009 | Zoughi | | |
| 2010/0141358 A1* | 6/2010 | Akyurtlu | .................... | H01P 1/20 |
| | | | | 333/219.1 |
| 2014/0022106 A1* | 1/2014 | Duvoisin | ............ | G01S 13/0209 |
| | | | | 342/22 |
| 2015/0268218 A1* | 9/2015 | Troxler | ..................... | G01N 9/24 |
| | | | | 342/21 |
| 2016/0211906 A1* | 7/2016 | Woodsum | ................ | H04B 1/16 |
| 2016/0266248 A1* | 9/2016 | Smith | .................. | H01Q 21/061 |
| 2016/0306063 A1* | 10/2016 | Hyde | ..................... | G01S 13/885 |
| 2018/0196134 A1* | 7/2018 | Safavi-Naeini | ....... | G01S 13/887 |
| 2018/0356333 A1 | 12/2018 | Shehri | | |
| 2019/0094408 A1* | 3/2019 | Boyarsky | .................. | G06T 5/73 |
| 2019/0339380 A1* | 11/2019 | Marks | .................... | G01S 13/887 |
| 2021/0034058 A1* | 2/2021 | Subramanian | .......... | G06T 17/05 |
| 2021/0387076 A1* | 12/2021 | Vaksdal | ................ | G01S 13/886 |
| 2021/0405182 A1* | 12/2021 | Reynolds | ............. | G01S 13/887 |
| 2022/0326018 A1* | 10/2022 | Rivers | ..................... | G01S 13/86 |

FOREIGN PATENT DOCUMENTS

| | | | | |
|---|---|---|---|---|
| CN | 110146521 A | 8/2019 | | |
| WO | 9915883 A1 | 4/1999 | | |
| WO | WO-2012158840 A1 * | 11/2012 | ............ | A61B 5/002 |
| WO | WO-2018021973 A2 * | 2/2018 | ................ | H01P 7/00 |
| WO | 2019190396 A1 | 10/2019 | | |

OTHER PUBLICATIONS

M. Fallahpour, J. T. Case, M. T. Ghasr and R. Zoughi, "Piecewise and Wiener Filter-Based SAR Techniques for Monostatic Microwave Imaging of Layered Structures," in IEEE Transactions on Antennas and Propagation, vol. 62, No. 1, pp. 282-294, Jan. 2014, doi: 10.1109/TAP.2013.2287024. (Year: 2014).*

B. Hu, Z. Ren, M. S. Boybay and O. M. Ramahi, "Waveguide Probe Loaded With Split-Ring Resonators for Crack Detection in Metallic Surfaces," in IEEE Transactions on Microwave Theory and Techniques, vol. 62, No. 4, pp. 871-878, Apr. 2014, doi: 10.1109/TMTT.2014.2309897. (Year: 2014).*

A. M. Albishi, M. S. Boybay and O. M. Ramahi, "Complementary Split-Ring Resonator for Crack Detection in Metallic Surfaces," in IEEE Microwave and Wireless Components Letters, vol. 22, No. 6, pp. 330-332, Jun. 2012, doi: 10.1109/LMWC.2012.2197384. (Year: 2012).*

Z. Ren, M. S. Boybay and O. M. Ramahi, "Near-Field Probes for Subsurface Detection Using Split-Ring Resonators," in IEEE Transactions on Microwave Theory and Techniques, vol. 59, No. 2, pp. 488-495, Feb. 2011, doi: 10.1109/TMTT.2010.2094201. (Year: 2011).*

International Preliminary Report of Patentability for corresponding application PCT/SG2021/050280 filed May 21, 2021; Mail date Mar. 28, 2022.

International Search Report for corresponding application PCT/SG2021/050280 filed May 21, 2021; Mail date Aug. 18, 2021.

Written Opinion for corresponding application PCT/SG2021/050280 filed May 21, 2021; Mail date Aug. 18, 2021.

* cited by examiner

1D

6B

1E

NON-CONTACT MICROWAVE TESTING SYSTEM AND METHOD FOR SEE-THROUGH IMAGING

CROSS-REFERENCE TO RELATED APPLICATIONS

This application claims the benefit of priority of Singapore application No. 10202004777Y, filed 21 May 2020, the contents of it being hereby incorporated by reference in its entirety for all purposes.

FIELD OF THE INVENTION

The present invention relates a non-contact microwave-based testing or evaluation system and methods for inspecting composite structures and, more particularly, to a system and method for non-contact, see-through, deep penetrating inspection of structures with high resolution image reconstruction.

BACKGROUND OF THE INVENTION

Non-destructive testing and evaluation (NDT&E) is the practice where the area under test (AUT) and its utility are not affected directly by said testing and evaluation procedure. All major infrastructure assets need to undergo periodic NDT&E to ascertain their value and to avoid major accidents compromising the asset and safety. In the built environment sector, the different assets that require periodic NDT include: 1) Facade structures of buildings, 2) Concrete pillars and walls that support the structural integrity of the buildings, dams, bridges, and 3) Indoor mechanical, electrical and plumbing fittings concealed behind walls and ceilings. The assets undergo the natural aging process with time, leading to various kinds of defects/anomalies. When left undetected, these defects compromise the asset condition, ultimately leading to asset failure and the cause of possible accidents. Examples of the various kinds of defects/anomalies or information on different types of assets are listed as follows:

1) Facade structures:
   Glass curtain Wall: Cracks and corrosion in metallic brackets holding the glass curtain walls, delamination;
   Tiled wall: Loose tiles, cracks, delamination;
   Natural stone cladding: Cracks and corrosion in metallic brackets holding the cladding, delamination;
   Metallic brackets holding the various cladding systems: The location, presence and shape of the metallic brackets.
2) Concrete pillars and walls:
   Detection of the location, presence and size of rebars for facilitating repair works involving drilling;
   Monitoring cracks and degree of corrosion in rebar structures embedded in concrete;
   Concrete spalling and compromise in the structural integrity of the asset;
   Air gaps (voids) embedded in concrete structures introduced during the construction phase.
3) Indoor mechanical, electrical and plumbing (MEP) concealed behind walls and ceilings:
   Detection of the location, presence and size of rebars for facilitating repair works involving drilling;
   Detection of utilities and electrical wiring embedded in walls and other structures;

Cracks and corrosion in pipelines leading to leakage/seepage, wire breakage, delamination.
4) Water leakage/seepage detection:
   Moisture detection in infrastructure elements for water seepage detection.

Some of the commonly used NDT&E systems and techniques in the current practice include the following:

Visual/Optical camera-based inspection: This involves the usage of cameras or visual inspection of assets to identify anomalies that have reached a stage wherein they are apparent on the external surface of the assets. Such inspection systems are reactive rather than proactive and do not possess the capability of identifying defects that are embedded in the asset and are not visible apparently.

Infrared (IR) based inspection: Another quick inspection methodology is by employing IR based imaging of the asset. This provides a quick inspection scheme which can pick up the surface and sub-surface defects such as delamination and water seepage (embedded defects). However, such inspection technology is highly dependent on the external environmental conditions for its proper operation, providing reliable results.

Ultrasound NDT: This inspection methodology is used for see-through inspection of assets to identify defects such as cracks and corrosion in rebars under concrete walls and pillars. The inspection process requires the scanning system to be in physical contact with the asset under inspection. This makes the inspection process a time consuming and tedious process.

Microwave Ground Penetrating Radar (GPR) NDT: This is an alternative inspection methodology where electromagnetic waves are used to probe the asset to identify hidden and embedded defects. For efficient operation, such a scanning system also has to be in physical contact with the asset under inspection.

U.S. Pat. No. 6,772,091 B1 discloses a method for testing a substantially concrete structure using ground penetrating radar (GPR) technique comprising: receiving a plurality of computer-readable data signals, wherein each data signal represents an electromagnetic signal detected from an area of the concrete structure, and wherein one or more of the detected electromagnetic signals include electromagnetic energy reflected from the concrete structure as a result of a corresponding electromagnetic signal transmitted into the concrete structure; selecting one of the data signals, the selected data signal corresponding to the first reinforcing bar; and determining a first distance of the first reinforcing bar from the first side of the substantially concrete structure based on the selected data signal alone from among the plurality of data signals.

US20110115666A1 discloses an air-launched antenna GPR system and method, which comprises calibrating a ground penetrating radar system comprising: using an air-launched transceiver to reflect an ultra-wide band signal off a homogeneous material; using an inline analog rejection filter to block a selection of frequencies in a reflected said signal based on anticipated interference from external signals; shaping said reflected signal with a digital filter to at least partially restore said ultra-wide band signal; and using transversal coefficients determined in said prior step of shaping to shape a reflection of an ultra-wide band signal off a heterogeneous material.

U.S. Pat. No. 5,384,543 discloses a portable microwave instrument for evaluating characteristics of a structural member and includes a source of microwave energy, a transmitter coupled to the source of microwave energy for transmitting a microwave signal at the structural member, and a receiver positioned on the same side of the structural member as the transmitter and being disposed to receive a microwave signal reflected by the structural member. This is a hand-held, portable instrument, capable of evaluating structural members, such as building walls, to determine the characteristics of their construction. The instrument uses low-power microwave energy and differential phase detection to characterize the size of blocks, location of voids, etc., within a wall. The hand-held instrument for microwave NDT consists of the display and control module and the probe module. The displays of indications are similar as in eddy current testing.

For scanning a particular asset, conventionally, the scanner is moved/rolled over the area that has to be scanned. Such a process is usually manual, time-consuming, and tedious. Accordingly, there are two main problems with conventional scanners that need to be addressed:

synthesizing a larger aperture to cover a large area and produce high-resolution scan results; and designing signal processing algorithms for homogeneous medium instead of layered medium.

Thus, there exists a need to provide a portable system and method for the inspection and testing of various asset structures, that integrates innovative technological solutions in order to possess the following capabilities: Contactless, fast scanning solution; Deep penetration to identify various defects in facade structures, structural entities (concrete pillars and concrete walls), indoor MEP condition monitoring, etc; ability to be mounted/fixed on various platforms such as UGVs, drones and robotic arms; Intuitive user interface for ease of use for effective and quick data interpretation (manual and automated by AI algorithms); and improvement to inspection efficiency, reduction of safety risk for inspection personnel, time saving, and reduction of workforce cost.

SUMMARY OF THE INVENTION

The invention describes a system and method for microwave-based imaging solution for non-destructive testing (NDT) and evaluation of an area related to various kinds of assets including but not limited to facades & cladding systems, structural entities such as concrete pillars and concrete walls, bridges, tunnels, and dams. The system can operate in the frequency range varying between 0.1 GHz to 10 GHz. However, the defined concepts and implementation methodologies of the invention are not specific to the frequency range and can encompass a much broader range of operating frequencies.

Accordingly, in one aspect the present invention relates to a non-contact microwave testing system for see-through imaging of an area under testing, comprising: a front-end subsystem for transmitting and receiving electromagnetic waves to and from the area under testing; a system in package (SiP) subsystem comprising transmitter and receiver radio frequency (RF) chains; and a signal processing subsystem to perform reconstruction of spatial reflectivity of heterogeneous multi-layered media in the area under testing.

In one embodiment, the front-end subsystem comprises at least one transmitter antenna and at least one receiver antenna.

In one embodiment, the front-end subsystem comprises at least one transceiver.

In one embodiment, each antenna or transceiver is integrated with a metamaterial-based lens that enables sub-wavelength, high-resolution imaging.

In one embodiment, the system in package (SiP) subsystem generates a stepped frequency continuous waveform (SFCW).

In one embodiment, the signal processing subsystem comprises backpropagation algorithms for reconstruction of spatial reflectivity suitable for multi-layered media and SFCW waveform.

In one embodiment, the system further comprises: a localization subsystem; and an interface subsystem for reconstruction of a high-resolution image.

In one embodiment, the localization subsystem comprises optical flow sensors, an inertial measurement unit (IMU), and barometric pressure sensors.

In one embodiment, the interface subsystem transfers data from the signal processing subsystem to a cloud server or local tablet PC for reconstruction of the high-resolution image.

In one embodiment, the front-end subsystem is a beam focusing MIMO front-end subsystem comprising an array of transmitter antennas that are time-division multiplexed and an array of receiver antennas forming a virtual antenna array based on the physical arrangement of the transmitter and receiver antennas; wherein the system in Package (SiP) subsystem is a MIMO SiP subsystem comprising the transmitter and receiver RF chains for generating a stepped frequency continuous waveform; and wherein the localization subsystem provides location information of the system for the signal processing subsystem to synthesize a large synthetic aperture for 3D image reconstruction.

In one embodiment, the front-end subsystem is a beam focusing antenna front-end subsystem comprising a single transceiver; wherein the system in Package (SiP) subsystem is a monostatic reflectometer array SiP subsystem comprising the transmitter and receiver RF chains for generating stepped frequency continuous waveform; wherein the signal processing subsystem is a digital beamforming signal processing subsystem; wherein the localization subsystem is deployed on a moving platform and provides the location information of the system for the signal processing subsystem to synthesize a large synthetic aperture for 3D image reconstruction.

In one embodiment, each antenna element or transceiver operates in the frequency range from 0.1 GHz to 10 GHz, preferably from 0.1 GHz to 6 GHz.

In one embodiment, the metamaterial-based lens is made from double negative materials (DNG) having the property of negative index, which enables sub-wavelength high-resolution imaging.

In one embodiment, the metamaterial-based lens contains concentric periodic split-ring resonators (SRRs) of varying sizes and concentric circular trace lines running in the bottom layer of the lens.

In one embodiment, the lens is placed on top of the antenna element or transceiver for long-distance non-penetrative scanning.

In one embodiment, the system is configured to be integrable with other mechanical/electrical equipment for combined operations.

In one embodiment, the system is configured to be hand-held, mounted/fixed on a payload-carrying, autonomous/semi-autonomous/controlled system selected from an unmanned ground vehicle (UGV), a drone, a robotic arm, a crawler robot and/or a combination thereof for non-destructive inspection of facilities such as facade structures, cladding systems, concrete pillars and walls, indoor mechanical, electrical and plumbing (MEP) fittings, water, oil and gas pipelines, metallic parts, roads, tree trunks, tunnels, dams, bridges, medical imaging, security surveillance and warehouse sorting.

In one embodiment, the system is configured to be handheld, wherein the front-end subsystem comprises: a single input single output (SISO) configuration consisting of a single transmitting and receiving wideband antenna elements; a monostatic array of antenna elements; or a MIMO array of antenna elements.

In one embodiment, the system is mounted/fixed on a payload-carrying, autonomous/semi-autonomous/controlled system selected from an unmanned ground vehicle (UGV), drone, robotic arm and crawler robot, wherein the front-end subsystem comprises: a beam focusing antenna sub system with a single transceiver; a MIMO sub system with multiple transceivers; or a monostatic array of reflectometers.

In another aspect of the present invention, there is provided a method for non-contact see-through imaging of an area under testing using the system disclosed herein, the method comprising the steps of: generating electromagnetic waves by the SiP subsystem; transmitting the generated electromagnetic waves to the front-end system through an RF interface; transmitting and receiving backscattered signals to the front-end subsystem from the area under testing; routing received RF signals to the signal processing subsystem by the SiP subsystem for signal processing and reconstruction of spatial reflectivity of heterogeneous multi-layered media in the area under testing.

In one embodiment, the method further comprises the steps of: combining data from the SiP subsystem and a localization subsystem by the signal processing subsystem to perform 3D image reconstruction algorithms and data interpretation schemes which are routed to an interface subsystem; routing the data interpretation and the reconstructed 3D image by the interface subsystem through wired or wireless transmission to a cloud server or local tablet PC for a user to visualise the image of the area under testing.

In one embodiment, a stepped frequency continuous wave (SFCW waveform) is generated by the SiP subsystem.

In one embodiment, the backscattered signals from the area under testing are directly sampled at an aperture of the front-end subsystem, by a reflectometer utilizing a Schottky diode at an aperture of an antenna with a metamaterial-based lens.

In one embodiment, a dead reckoning algorithm for IMU is combined with an optical flow sensor, for retrieving accurate coordinate information from the localization subsystem.

In one embodiment, the transmission is selected from USB, ethernet, WiFi, Bluetooth, ZigBee based on the use case scenarios.

In one embodiment, the data stored in the cloud server or local tablet PC can be accessed by using a web application in any computing system such as workstation/PC, tablet PC or mobile phone.

In one embodiment, an additional phase is added to a collected frequency spectrum in a piecewise manner, one layer at a time, for 3D imaging of the area under testing.

In one embodiment, dyadic green functions (DGF) of the multi-layered media are used to incorporate the attenuation and properties of the layers.

In one embodiment, inverse scattering methods are used for determining the 3D quantitative image of the area under testing including parameters such as permittivity and conductivity.

BRIEF DESCRIPTION OF THE DRAWINGS

The above and other objects, features and other advantages of the present invention will be more clearly understood from the following detailed description taken in conjunction with the accompanying drawings. For the purpose of illustrating the present disclosure, exemplary constructions of the disclosure are shown in the Figures. However, the disclosure is not limited to specific methods and instrumentalities disclosed herein.

DETAILED DESCRIPTION

Figure 1:
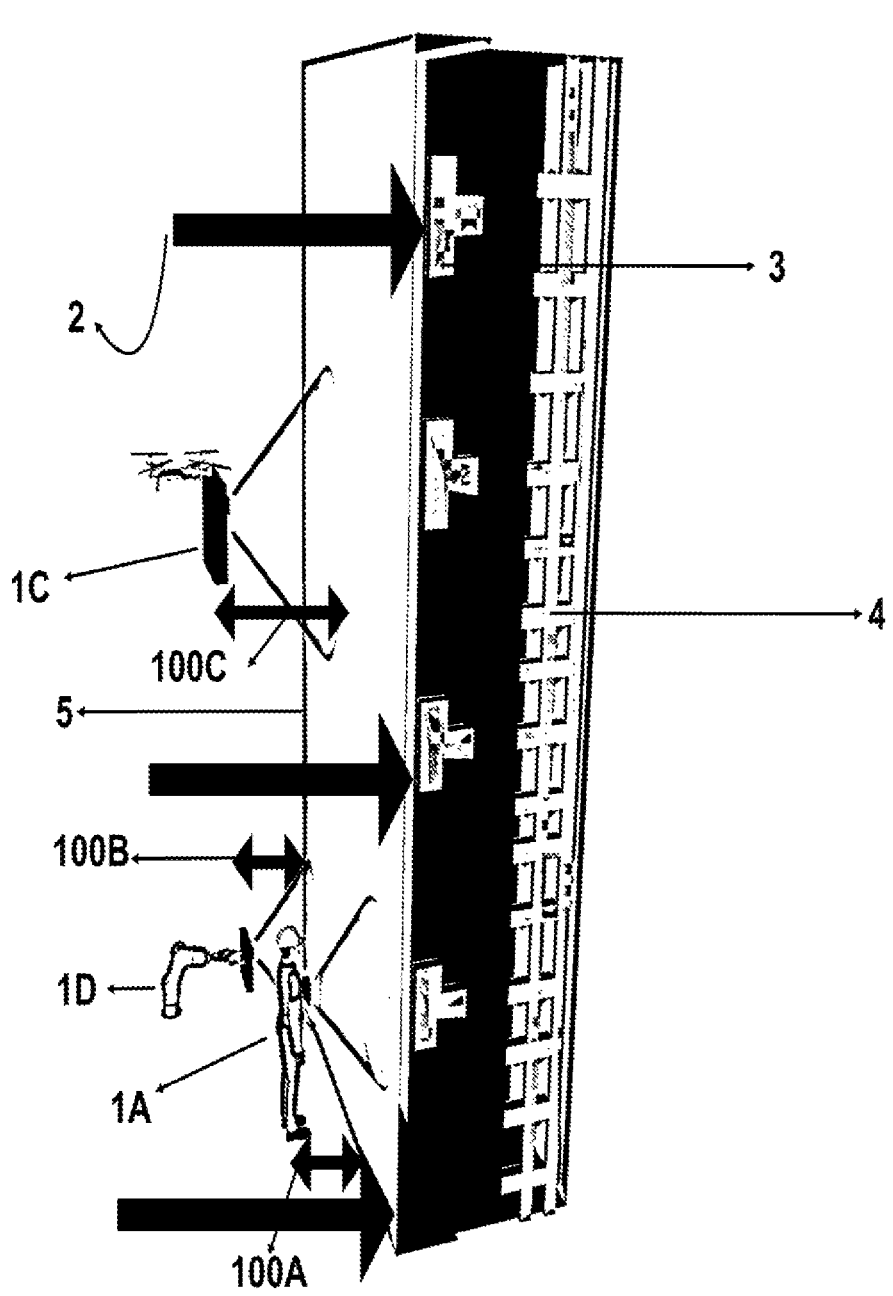
FIG. 1 illustrates various embodiments of the non-contact microwave testing system disclosed herein capable of deep penetration at a stand-off distance.
Figure 2A:
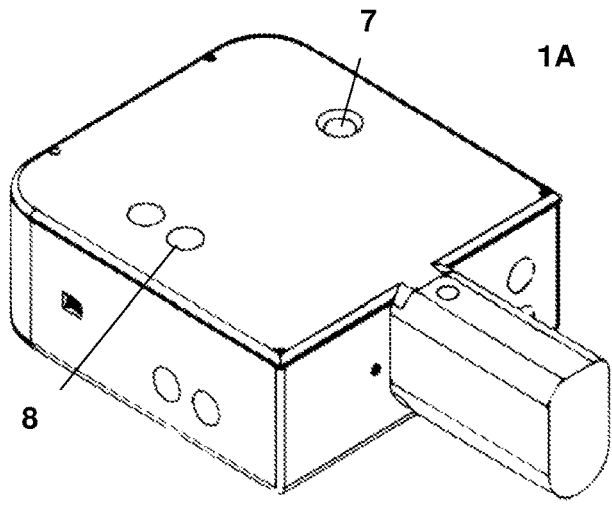
FIG. 2A-E illustrates various form factors the testing system disclosed herein can assume depending on the use case and application scenario. The different form factors include a hand-held testing system 1A, a rover mounted testing system 1B, a drone mounted testing system 1C, a robotic arm mounted testing system 1D and a wall crawling testing system 1E.
Figure 2B:
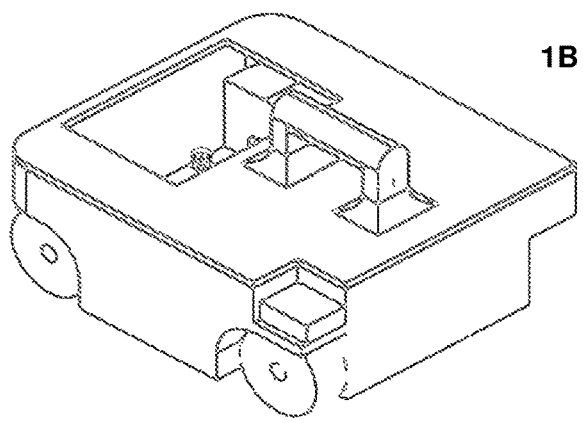
Figure 2C:
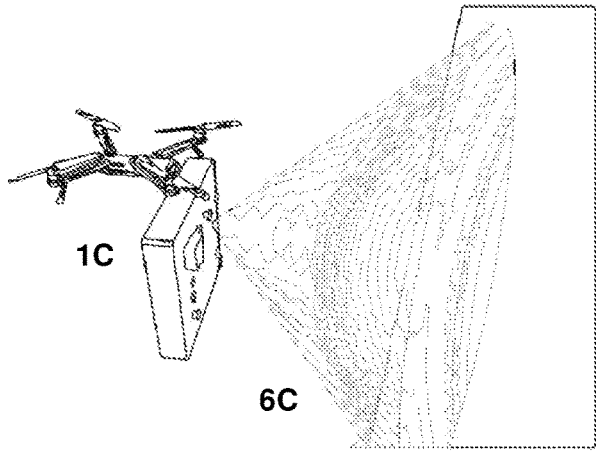
Figures 2D, 2E:
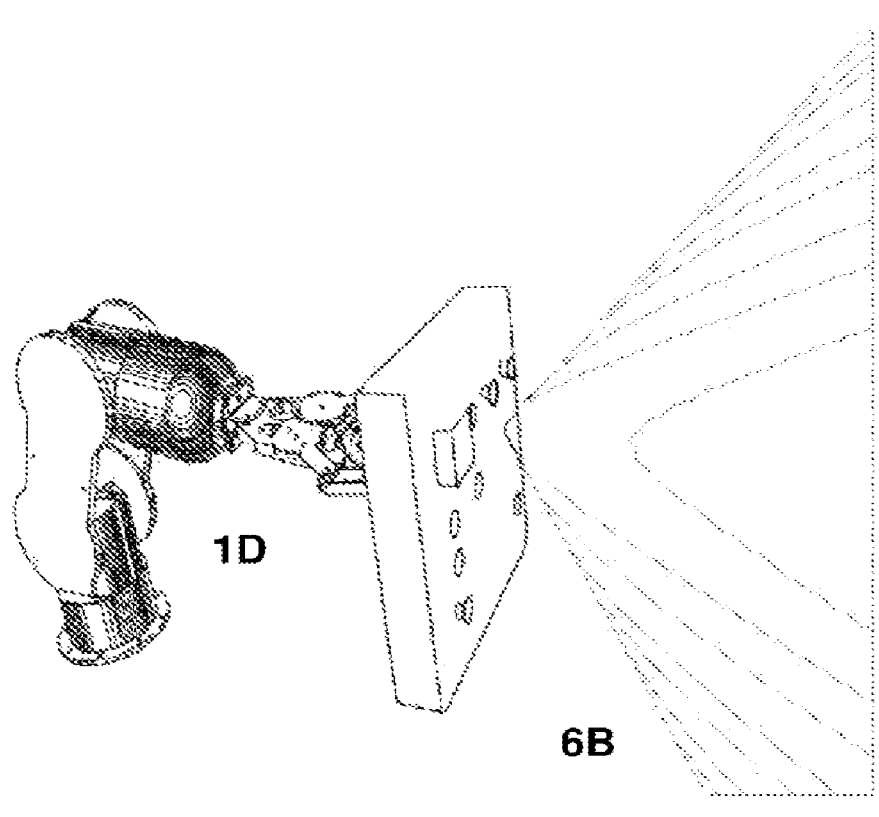

For the purposes of providing an understanding of the principles of the invention and the scope of applications involved therein, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

In the following description, algorithms and functions may be shown in block diagram form in order not to obscure the present invention in unnecessary detail. Conversely, specific application implementations shown and described are exemplary only and should not be construed as the only way to implement the present invention unless specified otherwise herein. Additionally, block definitions and partitioning of logic between various blocks are exemplary of a particular implementation. It will be readily apparent to one of ordinary skill in the art that numerous other partitioning solutions may practice the present invention. For the most part, details concerning timing considerations and the like have been omitted where such details are not necessary to obtain a complete understanding of the present invention and are within the abilities of persons of ordinary skill in the relevant art.

The invention describes a microwave testing system for realizing a non-contact, non-destructive, deep-penetration, see-through imaging radar solution using propagating electromagnetic waves in the microwave frequency regime. The testing system according to the invention can have utility in a variety of industries, including but not exclusive to the building and construction (indoor and outdoor) industry, whereby the system disclosed herein can be used to test and evaluate assets such as dams, bridges, and tunnels for monitoring the structural condition of the respective assets. In order to achieve non-contact imaging using microwaves, a number of component level, system-level, and application-level innovations can be applied. The non-destructive testing of structures in assets refers to the ability of the system disclosed herein to image and evaluate said structure without harming the structure or requiring any disassembly of said structure. In the context of the present invention, "high-resolution" can refer to any achieved image resolution that is lesser than lambda/4 ($\lambda/4$) for a certain subset of operating frequency.

For Example, the testing system disclosed herein can be used to test and evaluate facades and claddings in order to detect defects such as cracks and corrosion in metallic brackets hidden behind claddings, thus preventing the delamination of facade structures. In another embodiment, the system can be used to test and evaluate the condition of metallic reinforced bar structures (cracks and corrosion in rebar structures) embedded inside concrete pillars, forming the structural blocks of these buildings. In another embodiment, the system can be used to detect defects in mechanical, electrical, and plumbing (MEP) fittings inside buildings to detect maintenance issues such as cracks and corrosion in pipes, water leakage from pipelines, water seepage in concrete and detect the presence of rodents. In another embodiment, the system can be used to test and evaluate the condition of metallic reinforced bar structures (cracks and corrosion in rebar structures) embedded inside concrete pillars and concrete walls. In this regard, the system disclosed herein can be used to identify and quantify cracks and corrosion (spalling) in rebar structures, chloride ingress in concrete and identify/quantify cracks and voids inside concrete structures.

In order to image and test a particular asset, a conventional scanner system is contacted with and moved/rolled over the area which is usually manual, time-consuming, and tedious. The system disclosed herein aims to at least solve two main problems with conventional scanners related with firstly, synthesizing a larger aperture to cover a large area under testing to produce high-resolution scan results, and secondly, designing signal processing algorithms for heterogenous layered medium instead of homogeneous medium.

To achieve a larger aperture, methods such as digital beamforming, a monostatic array, or a multiple-input multiple-output (MIMO) beamforming/virtual monostatic array can be employed. These methods can be used in tandem with moving the scanner to achieve a larger aperture faster. However, if the scanning process is carried out by a person, it can still be time-consuming to inspect large areas of an asset. To address this problem, mounting the scanner in automation platforms such as drones, UGVs, and robotic arms for scanning a large area of the asset can be suitable. However, to fit in automation platforms, it is ideal for the scanner to possess non-contact scanning capability.

Signal processing algorithms for a non-contact scanning and inspection solution can take into account the nature of the layers of the different medium in front of the scanner, which includes free space and the layered medium of the asset (air+concrete, air+façade, etc.). Typical signal processing algorithms consider the medium in front of the scanner as a homogenous medium (e.g., only a continuous concrete layer). Accordingly, in one embodiment, the system disclosed herein is capable of scanning an AUT of an asset that includes a heterogenous multilayer of mediums.

The system disclosed herein can be configured and adapted for deployment in various modalities such as handheld, mounted/fixed on a payload-carrying, autonomous/semi-autonomous/controlled system. In one embodiment, the system disclosed herein can be configured and adapted for mounting/fixing on a drone, an unmanned ground vehicle (UGV), a robotic arm or a crawler robot and/or a combinations thereof, by means of a mounting interface/frame.

Figure 3:
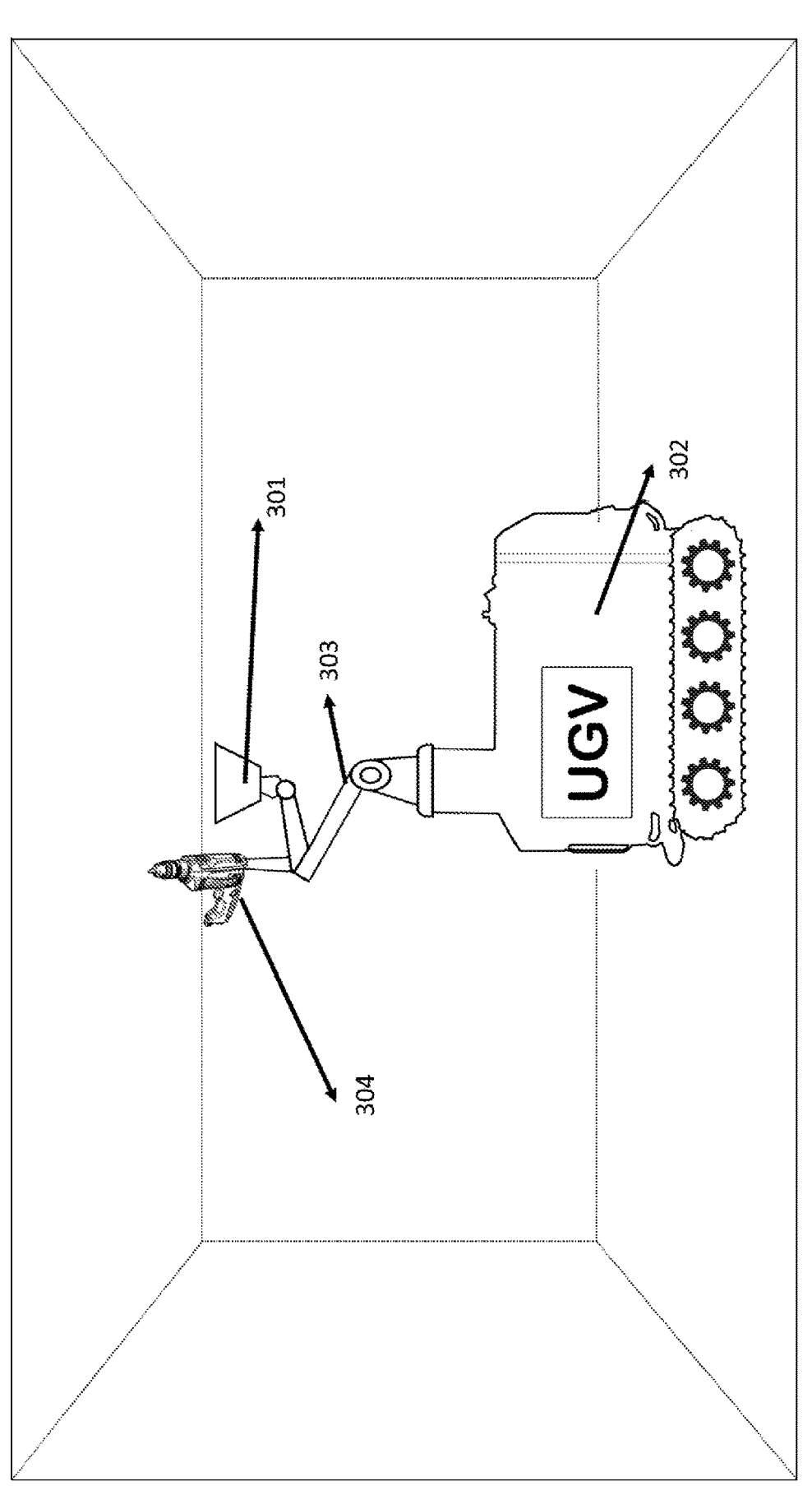
FIG. 3 is an illustration of the testing system disclosed herein integrated together with a UGV and a Cobot for coordinated functioning.

In some embodiments, the testing system can be configured to be integrable with other mechanical/electrical equipment for combined system operation in a coordinated manner to achieve a required functionality. FIG. 3 illustrates an embodiment of the invention whereby the testing system can be integrated together with a UGV and a Cobot for coordinated functioning. As will readily be apparent, the system disclosed herein can be generally used as a sensory input for compatible mechanical/electrical equipment.

The system disclosed herein can be configured and adapted for use in non-contact, non-destructive inspection of assets and an area under testing (AUT) of said asset. The asset can include but is not limited to:

1. Facade structures (detection of cracks and corrosion in metallic brackets holding the structure, delamination in glass curtain wall or natural stone cladding; detection of loose tiles, cracks, delamination, etc in tiled wall);
2. Cladding systems (detection of the location, presence and shape of metallic brackets holding the various cladding systems);
3. Concrete pillars and walls (detection of the location, presence, and size of rebars for facilitating repair works involving drilling; monitoring cracks and degree of corrosion in rebar structures embedded in concrete; detection of concrete spalling and compromise in the structural integrity of the asset; detection of air gaps (voids) embedded in concrete structures introduced during the construction phase).

4. Indoor MEP concealed behind walls and ceilings (detection of the location, presence and size of rebars for facilitating repair works involving drilling; detection of utilities and electrical wiring embedded in walls and other structures; detection of cracks and corrosion in pipelines leading to leakage/seepage, wire breakage, delamination).

5. Pipelines (detection of flaws and damages in pipes leading to water leakage;

moisture detection in infrastructure elements for water seepage detection;

detection of corrosion under insulation in oil & gas pipelines, corrosion under concrete fireproofing in legs of large spherical tanks/containers/pipes;

inspection of composite wraps used in repair of pipelines).

6. Air-craft fuselages (inspection of cracks and corrosion under paint in metallic parts of the air-craft fuselage; inspection of composite parts for interfacial delamination and internal defects)

7. Product packaging (detect the interiors of a product and test for any cracks or damages without opening the package).

8. Infrastructure facilities (inspection of roads, tunnels, dams and bridges, tree trunks for hollowness, decay; checking for any surface defects or corrosion without disassembling the surrounding structure).

9. Biomedical Imaging (non-invasive method for detection of disease or imaging of body parts).

10. Automobile parts (detection of tyre thread size)

11. Security, surveillance and warehousing (inspecting metallic and non-metallic materials in building, airports, offices, and public places).

In one embodiment, the system disclosed herein can penetrate and see-through various differing materials that the asset and AUT inspected is composed of. The materials the system can penetrate or see-through can be non-metallic materials including but not limited to concrete, brick and mortar, ceramic facade, stone claddings, and glass facades. In one embodiment, the system can be capable of see-through inspection of any non-metallic material and surface level imaging for metallic materials.

The system disclosed herein can comprise a number of subsystems including but not limited to a front-end subsystem, a system in package (SiP) subsystem, a signal processing subsystem, a localization subsystem and an interface subsystem.

The front-end subsystem can be responsible for transmission and reception of the RF signals, and propagation to/from the SiP subsystem. The SiP subsystem can be responsible for control of an RF subsystem, waveform synthesis and data capture. The signal processing subsystem can be responsible for the image reconstruction (3D) of the back scattered signals (electromagnetic waves) from the AUT. The localisation subsystem can be responsible for determining the exact coordinate (x,y,z) information for every corresponding (t) for accurate 3D image reconstruction. The interface subsystem can be responsible for the transfer of data and control information from the testing system to the end user.

In one embodiment, the system disclosed herein can comprises a front-end subsystem for transmitting and receiving electromagnetic waves to and from the area under testing; a system in package (SiP) subsystem comprising transmitter and receiver radio frequency (RF) chains; and a signal processing subsystem to perform reconstruction of spatial reflectivity of heterogeneous multi-layered media in the area under testing. In the context of the present invention, spatial reflectivity can refers to the 3D image reconstruction of the back scattered signals from the AUT, whereby the spatial reflectivity will have an amplitude component and a phase component for each x, y and z coordinate.

In one embodiment, the system disclosed herein can further comprise a localization subsystem and an interface subsystem for reconstruction of a high-resolution image.

In one embodiment, the system disclosed herein can comprise a front-end subsystem; a system in package (SiP) subsystem; a signal processing subsystem; a localization subsystem; and an interface subsystem.

In one embodiment, the system can additionally comprise a processing subsystem.

The system disclosed herein can be used in a method for non-contact see-through imaging of an area under testing that can comprise the steps of: generating electromagnetic waves by the SiP subsystem; transmitting the generated electromagnetic waves to the front-end system through an RF interface; transmitting and receiving backscattered signals to the front-end subsystem from the area under testing; routing received RF signals to the signal processing subsystem by the SiP subsystem for signal processing and reconstruction of spatial reflectivity of heterogeneous multi-layered media in the area under testing.

The method disclosed herein can further comprise the steps of combining data from the SiP subsystem and the localization subsystem by the signal processing subsystem to perform image reconstruction algorithms and data interpretation schemes which are routed to the interface subsystem; and routing the data interpretation and the reconstructed image by the interface subsystem through wired or wireless transmission to a cloud server or local tablet PC for a user to visualise the image of the area under testing.

In one embodiment, the system disclosed herein can comprise: a front-end subsystem for transmitting and receiving electromagnetic waves to and from an area under testing; a system in package (SiP) subsystem comprising a transmitter and receiver radio frequency (RF) chains for generating a stepped frequency continuous waveform (SFCW); a signal processing subsystem comprising backpropagation algorithms for reconstruction of spatial reflectivity suitable for multi-layered media and SFCW waveform; a localization subsystem comprising optical flow sensors, an inertial measurement unit (IMU), and barometric pressure sensors; and an interface subsystem for transferring data from the signal processing subsystem to the cloud server or local tablet PC for reconstruction of a high-resolution image.

The testing system disclosed herein can be capable of synthesizing a large synthetic aperture to cover large area under testing (AUT) by utilizing aperture synthesis techniques such as digital beamforming, multiple input multiple output (MIMO) beamforming, virtual monostatic array, monostatic array configuration and/or by moving the system over an area in a non-uniform motion. In the context of the system disclosed herein, "non-uniform" can refer to any motion that is irregular and is not a "regular motion", for example a regular motion is a raster motion which entails a regular path in x-direction and y-direction.

The field of view of the testing system can depend on a combination of factors including the synthetic aperture that is produced by moving the testing system according to the present invention and/or the array produced by the configuration of the transmitter and receiver in the front-end subsystem. In particular, the testing system can be physically moved to obtain a larger synthetic aperture, or digital beam forming techniques can be used in antenna array for directional signal transmission and reception (to steer the beam in an intended direction). In this regard, the size of the aperture can be enlarged due to the movement of the system or beamforming comparable to a system that is stationary and/or lacks beamforming techniques.

In one embodiment, the field of view of the testing system can be dependent on the synthetic aperture that is produced by moving the testing system in a rectangular grid and the virtual array produced in time division multiplexed mode. In one embodiment, the field of view of the testing system can be dependent on the size of a monostatic reflectometer array employed in the system.

Conventional testing systems can use ground penetrating radar (GPR) techniques. A GPR (Stepped frequency continuous wave (SFCW) or pulsed) operates in a frequency range typically extending from 0.1 GHz to 6 GHz. The frequency range is chosen according to the use case scenario and application requirements. If the sensing application requires a much deeper penetration, then a lower frequency value is selected. The attenuation for a lower frequency electromagnetic (EM) signal is less than the attenuation for a higher frequency signal. However, for such applications, the resolution is compromised, whereby at lower frequencies, the cross-range resolution of a radar is limited by the diffraction limit. In order to overcome the diffraction limit, lensing methods can be employed. The traditional dielectric lens can be achieved by designing a curved dielectric structure that increases the gain and decreases the half-power beamwidth of a transmitting or a receiving antenna. However, traditional lenses cannot overcome the diffraction limit since they might not amplify the evanescent modes, leading to loss of near-field information. To overcome the diffraction limit, it is theoretically possible to use double negative materials (DNG) to design a flat lens. DNG materials have an effective negative permittivity and a negative permeability. These metamaterials do not occur in nature. However, they can be realized using periodic structures. These periodic structures typically possess narrow-band characteristics. For a scanning solution with a large bandwidth, a wideband DNG has to be designed to achieve focusing, overcoming the diffraction limit. Such a solution potentially increases the gain of the Tx/Rx antenna, enabling the scanning of the asset from a long distance in a non-contact manner.

Accordingly, in one embodiment, each antenna or transceiver can be integrated with a lens that enables sub-wavelength, high-resolution imaging. In one embodiment, the lens can be a metamaterial-based lens that enables sub-wavelength high-resolution imaging of the large AUT by overcoming the diffraction limit.

In one embodiment, the metamaterial-based lens can contain concentric periodic split-ring resonators (SRRs) of varying sizes and concentric circular trace lines running in the bottom layer of the lens.

In one embodiment, the metamaterial-based lens can be placed on top of the transmitter antennas and receiver antennas. In one embodiment, the lens can be an electromagnetic metamaterial-based lens. Electromagnetic metamaterial is engineered periodic structures that exhibit physical properties such as a negative refractive index, which is not exhibited by materials that occur in nature. These electromagnetic metamaterials may also be termed as negative index materials (NIM).

In one embodiment, the metamaterial-based lens can be a flat lens made from double negative materials (DNG) having the property of negative index, which enables sub-wavelength high-resolution imaging.

FIG. 1 represents the overview of the portable microwave testing system disclosed herein. The imaging system can operate in the electromagnetic wave frequency spectrum, which ranges from 0.1 GHz to 10 GHz, preferably between 0.1 GHz to 6 GHz. This frequency spectrum is chosen to be suitable for applications that require deeper penetration inside non-metallic materials including but not limited to concrete, brick and mortar, ceramic facade, stone claddings, and glass facades.

In one embodiment, the system disclosed herein can achieve a penetration depth of at least 0.20 m, or 0.30 m in the non-metallic materials and can vary depending on the material the area under testing is composed of. In one embodiment, the system disclosed herein can achieve a penetration depth of at least 0.20 m to 1 m, more preferably a penetration depth of at least 0.50 m in non-metallic materials.

All the different modalities of the testing system are non-contact with the asset to be subjected to said testing. In the context of the present disclosure "non-contact" refers to there being no physical contact between the system and said asset, whereby there exists a gap/space or stand-off distance of at least one lambda (A) therebetween. The space or stand-off distance between the asset (e.g. the building or structure in FIG. 1) and the testing system can depend on the use case and application scenario.

In one embodiment, the stand-off distance can be at least 1 lambda. In one embodiment, the stand-off distance can be at least about 0.01 m, 0.02 m, 0.03 m, 0.04 m, 0.05 m, 0.1 m, 0.2 m, 0.3 m, 0.4 m, 0.5 m, 1 m, 1.5 m or 2 m. In one embodiment, the stand-off distance can be in a range of 0.05 m to 5 m. In one embodiment, the stand-off distance can be in a range 0.5 m to 1 m. In one embodiment, the stand-off distance can be in a range 2 m to 3 m.

In one embodiment, the system disclosed herein can differentiate two distinct objects if a distance of at least about 0.02 m separates them. This refers to the systems range resolution and cross-range resolution of objects when scanning an area under testing. In one embodiment, the system can have a range resolution and cross-range resolution of at least about 0.01 m. In one embodiment, the system can have a range resolution and cross-range resolution of about 0.02 m. In one embodiment, the system can have a range resolution and cross-range resolution of about 0.025 m.

In certain embodiments, a cross-range resolution and a range resolution between 0.003 m to 0.0075 m can be achieved using advanced electromagnetic techniques.

As will be appreciated, the range resolution and penetration depth of the system disclosed herein can vary dependent on the area under testing and the stand-off distance from said asset. The range resolution can be dependent on the bandwidth that is used.

In one embodiment, the system in package (SiP) subsystem can generate a stepped frequency continuous waveform (SFCW) with a range resolution defined as $R_{res}=c/2B$, whereby B is the bandwidth of the SFCW waveform used and c is the velocity of light. The cross-range resolution can be dependent on the wavelength, the scanned aperture and the stand-off distance: $\delta_x=\lambda z_0/2D_x$, where $\lambda$ is the wavelength, $z_0$ is the stand-off distance and $D_x$ is the aperture size.

The maximum range scanned can be dependent on the amount of power that is transmitted as well as the frequency step size.

FIG. 2A-E represents different modalities of the testing system according to the invention. 1A represents an embodiment, where the testing system is a hand-held device that is portable, non-contact and can be held in a distance from the area under testing; 1B represents an embodiment, where the testing system is hand-held device according to 1A and mounted on wheels that roll on the surface of the asset under inspection; 1C represents an embodiment, where the testing system is mounted on a drone; 1D represents an embodiment, where the testing system is mounted on a ground-based robot platform; and 1E represents an embodiment where the testing system is deployed on a wall-crawling robot.

In one embodiment 1A, the testing system is deployed in a hand-held non-contact manner. In one embodiment 1B, the testing system is hand-held device according to 1A and mounted on wheels that roll on the surface of the asset under inspection. In another embodiment 1C the testing system is deployed on a drone. In a further embodiment 1D the testing system is deployed on an unmanned ground robot such as a robotic arm. In another embodiment 1E, the testing system is hand-held device according to 1A and deployed on a wall-crawling robot.

The typical stand-off distance (100A,100B) for 1A and 1D can be at least one λ at the centre operating frequency or can vary between about 0.5 m to 1 m with a penetration depth of at least about 0.5 m inside concrete (3), 0.6 m inside stone cladding (5) with a range resolution and cross-range resolution of 0.02 m.

The typical stand-off distance (100C) for 1C can be between about 2 m to 3 m with a penetration depth of about 0.2 m inside concrete (3) and 0.2 m inside stone cladding (5) with a range resolution and cross-range resolution of 0.02 m.

In FIG. 1, the arrow (2) represents the passage of the electromagnetic waves through the stone cladding (5) to inspect the condition of metallic brackets and through concrete (3) to inspect the structural condition of the mesh of structural rebars (4). This electromagnetic-based non-contact see-through testing system helps in identifying defects in concealed structures such as cracks and corrosion in metallic brackets behind facades and evaluation of structural integrity of the asset and area under testing (AUT) by monitoring the condition of rebars (4) embedded inside the concrete (3).

FIG. 3 illustrates an embodiment where the testing system (301) is integrated together with the unmanned ground vehicle (302) with a manipulator such as robotic arm (303). The robotic arm has other ends where other instruments such as drilling machines (304) and any other specific electrical/mechanical equipment can be integrated. Such an embodiment of the scanner system can be used to scan through and identify the locations of rebars/utilities embedded inside the infrastructure elements, such as walls, ceilings, flooring & pillars, etc., and can combine the functionality of various sensors & equipment in a closed-loop configuration to address target use case, such as restoration/renovation, and drillings for layout work.

Figure 4:
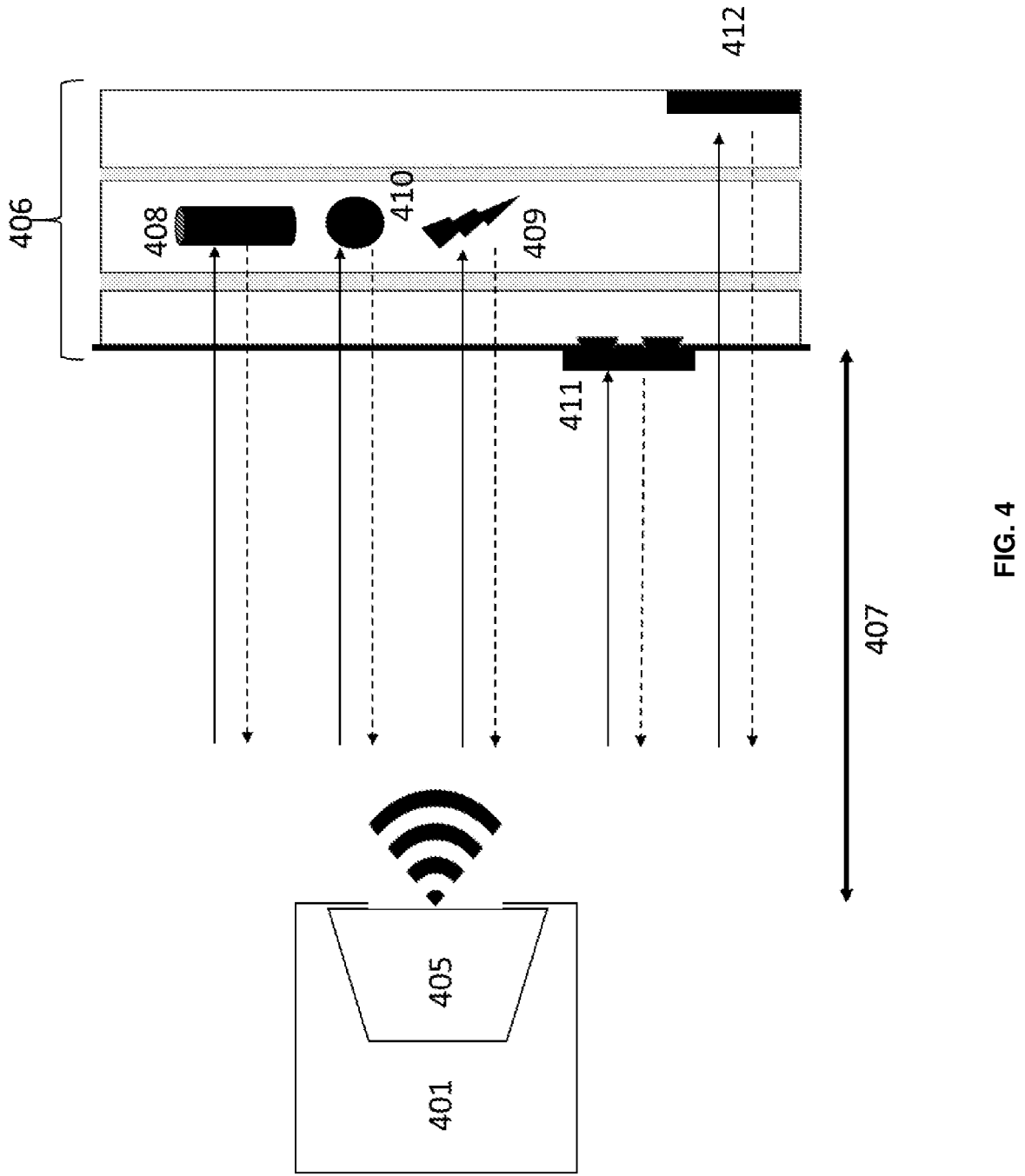
FIG. 4 is an illustration of the testing system disclosed herein operating in a non-contact manner with a stand-off distance for probing embedded objects in an asset and area under testing.

FIG. 4 shows the testing system (401) operating in a non-contact manner wherein the front-end subsystem and radar antenna (405) transmits and receives the electromagnetic waves. The testing system is at a stand-off distance (407) from the area under testing (AUT) (406). The AUT can include a multi-layered media with multiple layers of non-metallic materials such as cladding systems including glass, ceramic, stone, concrete layers, brickwork, etc. The stand-off distance includes the air medium that separates the system from the area under testing of the asset. The scanning system in specific embodiments can be used to test the presence of metallic rebars (408) in multi-layered media. In certain embodiments, the testing system can be used to probe for the presence of defects (409, 410) in fixtures (cracks, deterioration) behind facades (411) made of materials such as glass, ceramic, and stone, etc. In certain embodiments, the testing system can be used for inspection of condition and degree of corrosion in rebar structures (408). In certain embodiments, the testing system can be used for inspection of defects such as cracks, voids (409, 410) in concrete multi-layer. In certain embodiments, the testing system is used to probe for the presence of moisture inside infrastructure elements to detect water seepage (412).

Figure 5:
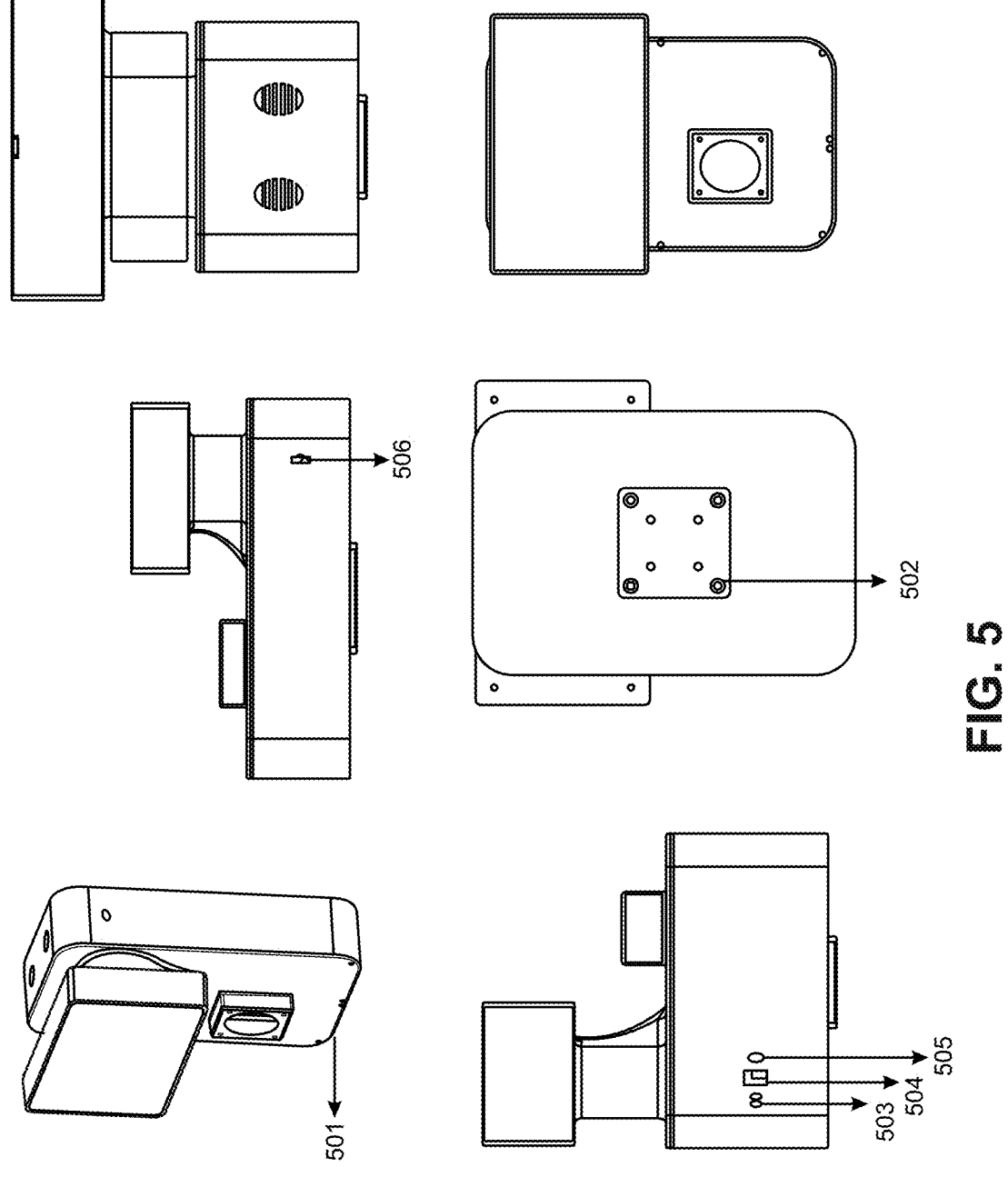
FIG. 5 shows the various perspectives of one embodiment of the testing system suitable to be fitted/mounted/integrated with other mechanical electrical equipment for autonomous/controlled/semi-autonomous inspection.

FIG. 5 shows various perspectives of the enclosure or casing (501) of the testing system suitable for stand-alone operation or operation with integration/mounting/fixing with other mechanical/electrical equipment for autonomous/semi-autonomous/controlled inspection. The testing system can include insets (502) on an exterior surface of the enclosure suitable for immediate integration/mounting/fixing with other equipment for coordinated operation. LEDs (503) can be provided on the sides of the enclosure to indicate the status of operation of the testing system along with a power socket (505) and a switch (504) for on/off operation. On the other side, there can be a port for digital input/output (506).

In one embodiment, the enclosure or casing of the testing system can include the front-end subsystem, the SiP subsystem, the signal processing subsystem, the localisation subsystem and the interface subsystem. In another embodiment, the enclosure or casing can include a processing subsystem. The enclosure or casing can be made of any suitable material suitable for operation in a desired modality of the system. As readily apparent to a person skilled in the art, the enclosure or casing can be made of any material that does not affect the performance of the electrical equipment and doesn't interfere with the electromagnetic waves.

The enclosure or casing of the system can be any suitable shape or size depending on the mode of use. In one embodiment, the enclosure or casing can be of any suitable size in the range of about 5×5×2.5 cm to about 75×75×75 cm. In another embodiment, the enclosure or casing can be of any suitable size in the range of 10×10×5 cm to 50×50×50 cm.

Figure 6:
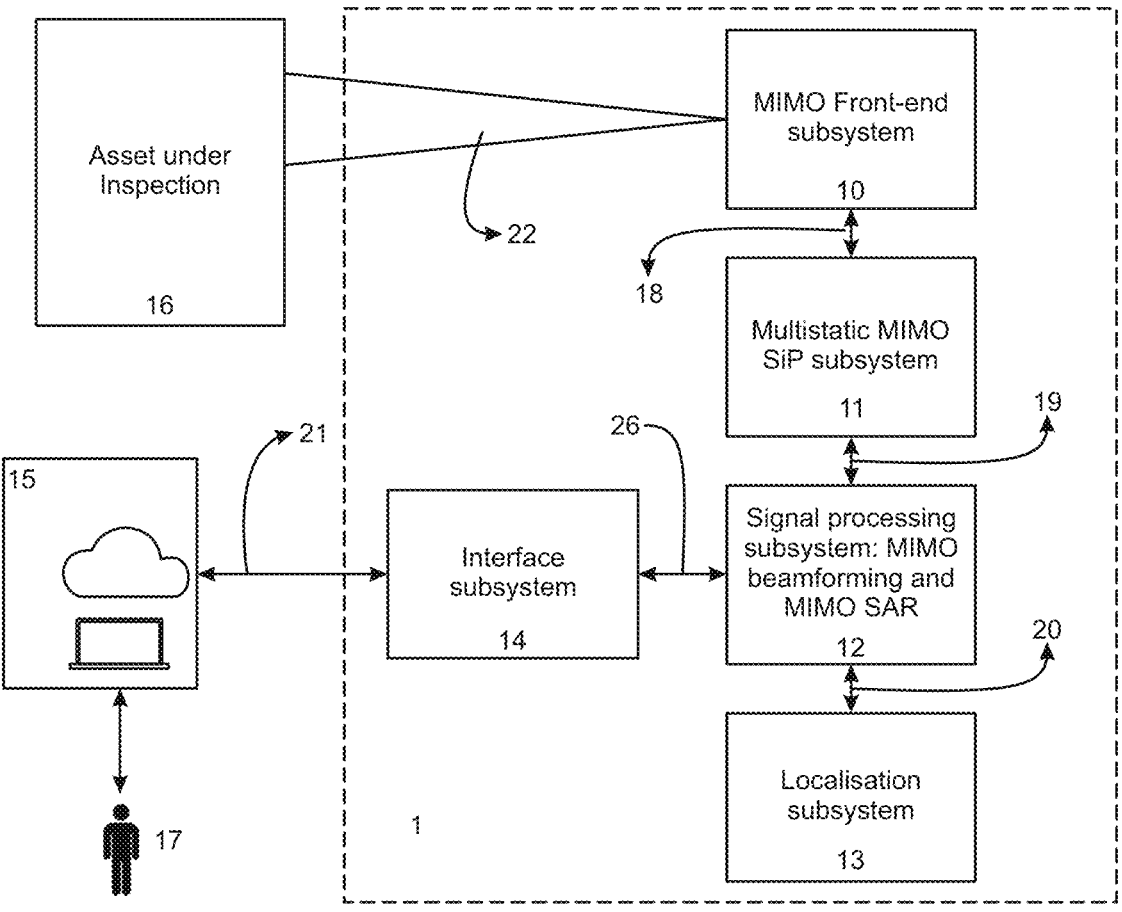
FIG. 6 illustrates one embodiment of the implementation of the various sub-systems of the testing system disclosed herein.
Figure 7:
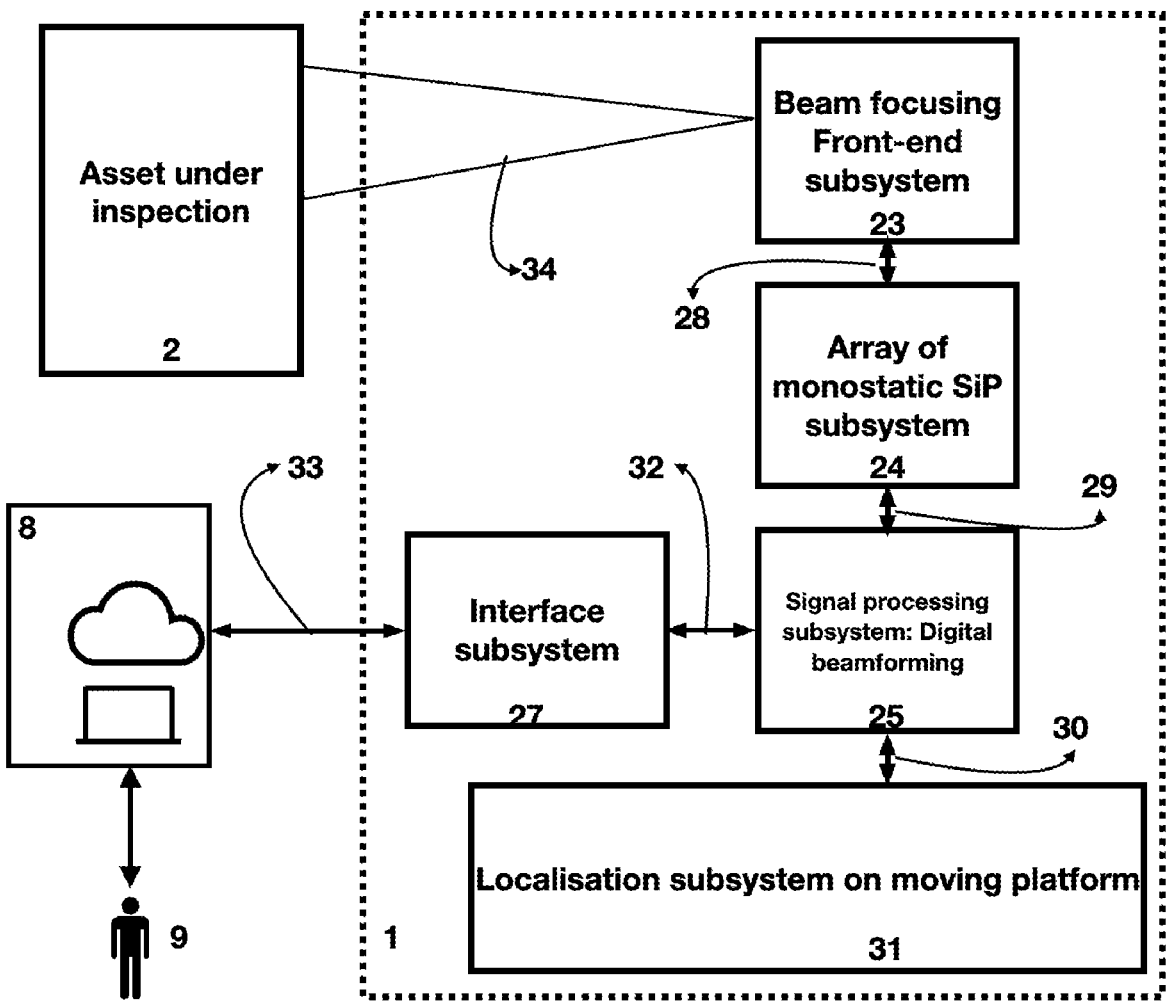
FIG. 7 illustrates an alternative embodiment of the implementation of the various sub-systems of the testing system disclosed herein.

Two alternative embodiments of the testing system according to the present invention with various sub-systems are provided in FIG. 6, and FIG. 7.

In the following description, the overall workflow for the scanning solution will be described followed by the detailed description of the sub-systems in the scanner, followed by the implementation of the described sub-systems to achieve the different modalities 1A, 1B, 1C, 1D or 1E.

While implementing the embodiment according to the block diagram depicted in FIG. 6, the testing system can include the following subsystems:

a beam focusing MIMO front-end subsystem (10) comprising an array of transmitter antennas that are time-division multiplexed and an array of receiver antennas forming a virtual antenna array based on the physical arrangement of the transmitter and receiver antennas. Each antenna element operates over a wide frequency range between 0.1 GHz to 10 GHz, preferably between 0.1 GHz to 6 GHz and is integrated with a metamaterial-based lens that enables sub-wavelength, high-resolution imaging;

a MIMO SiP subsystem (11) comprising transmitter and receiver RF chains for generating the stepped frequency continuous waveform in the frequency spectrum ranging from 0.1 GHz to 10 GHz, preferably between 0.1 GHz to 10 GHz;

a signal processing subsystem (12) to performs the reconstruction of spatial reflectivity (3D images) of the asset under inspection by employing various backpropagation algorithms suitable for multi-layered media and SFCW waveform;

a localization subsystem (13) to provide the location information of the scanner that is useful for the signal processing subsystem 12 to synthesize a large synthetic aperture for 3D image reconstruction;

an interface subsystem (14) responsible for the transfer of the data after signal processing to the cloud server or local tablet PC (15) wherein the 3D processed data visualization of the AUT happens. This visualization can be via a user interface (GUI), where the user (17) can interact with the system by modifying certain interactive elements on said GUI.

The SiP subsystem (11) can generate SFCW chirps and sends it to the front-end subsystem (10) through the RF interface (18). The front-end subsystem (10) can transmit and receive electromagnetic waves (backscattered signals) through the air medium (22). Analog-to-digital converter (ADC) data received RF signals are routed to signal processing subsystem (12) by SiP subsystem (11) through the baseband interface (19) for signal processing and reconstruction. The signal processing subsystem (12) combines the data from the SiP subsystem (11) and the localization subsystem (13) from the interface (20) to perform 3D image reconstruction algorithms and data interpretation schemes which are routed to interface subsystem (14) through the interface (26). The interfaces (26), (18), (19), and (20) are all within the testing system and are mostly through printed circuit board (PCB) traces either in microstrip configuration or coplanar waveguide (CPW) configuration. For the RF interface (18), the PCB trace lines will have a line impedance of 50 ohms to minimize the reflections. Baluns may be used to convert single lines into differential lines and vice versa. Since the data throughput for the interface (19) has to be large, parallel interface schemes including but not limited to camera serial interface (CSI) and low voltage differential signalling (LVDS) interface is used. Interface subsystem (14) routes the data interpretation and the reconstructed 3D image through wired or wireless transmission (21) to the cloud server or local tablet PC (15). The transmission (21) can be selected to be either wired (USB, ethernet, etc.) or wireless (WiFi, Bluetooth, ZigBee, etc.) based on the application and use case scenarios.

Figure 10:
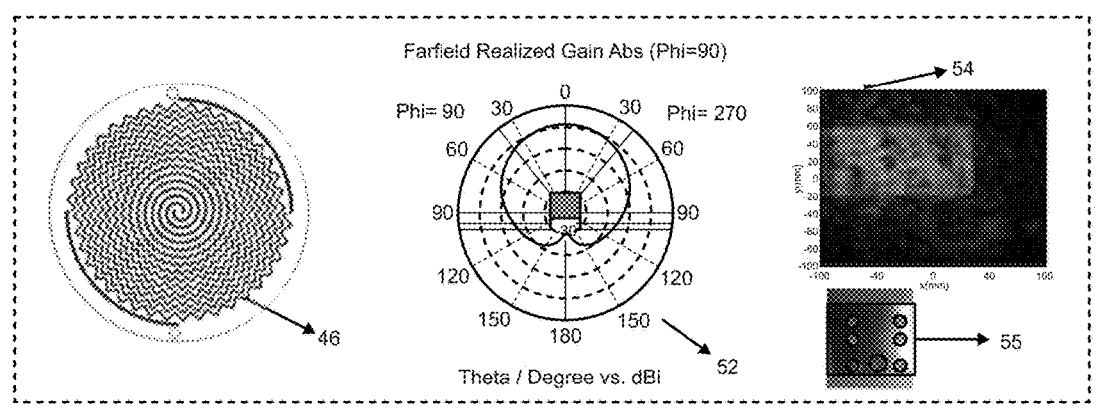
FIG. 10 illustrates the metamaterial-based lens of the front-end subsystem of the testing system disclosed herein.
Figure 10:
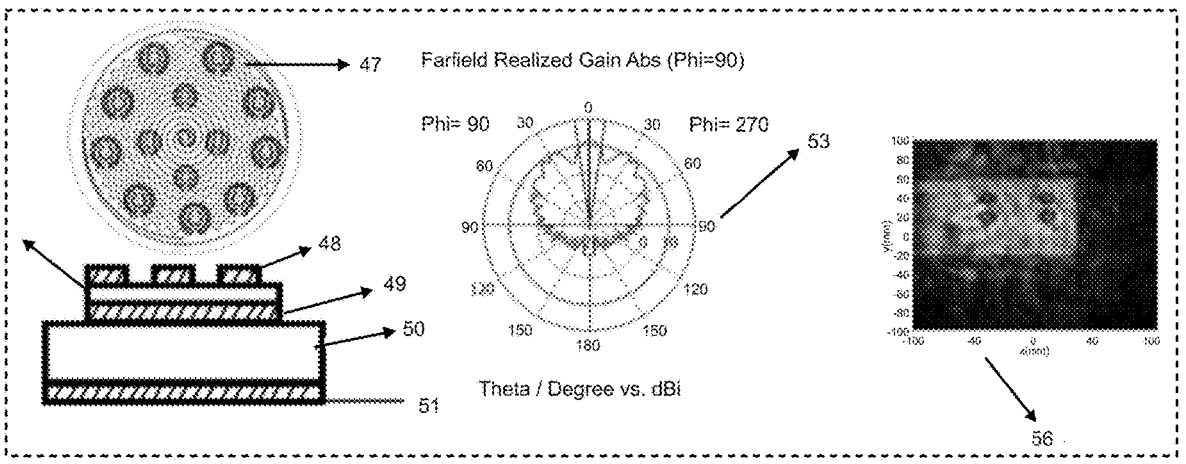
Figure 10:
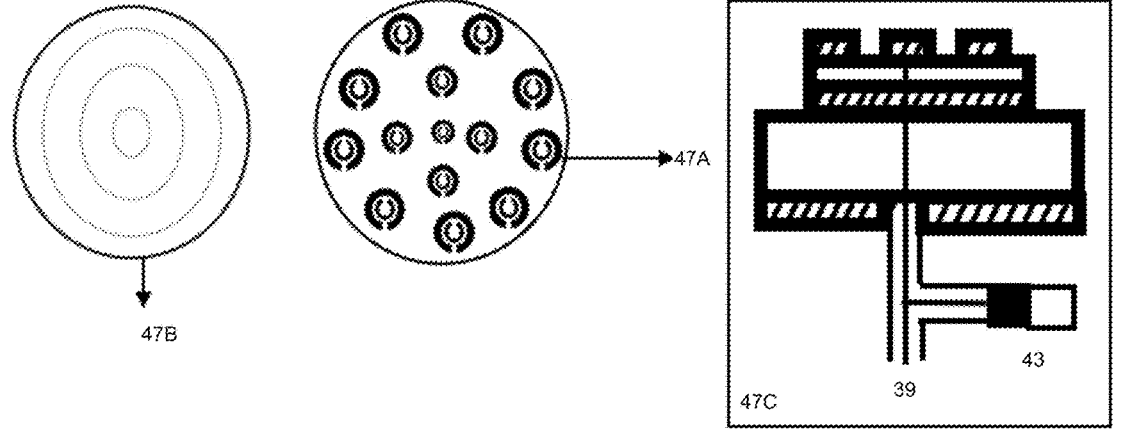

The front-end subsystem (10) can be comprised of an array of wideband antenna elements that operate in the frequency range between 0.1 GHz to 10 GHz, preferably between 0.1 GHz to 6 GHz, integrated with a metamaterial-based lens to improve antenna gain and reduce the half-power beamwidth. The metamaterial-based lens also enables sub-wavelength high-resolution imaging by overcoming the diffraction limit. FIG. 10 illustrates the wideband spiral antenna element (46), the radiation pattern of the antenna element (52), and the focused image (54) of the metallic bracket (55) with a number of holes. It can be seen that (54) is not very clear since the gain of the antenna is not very high (around 5 dBi), and the holes are much smaller than the wavelength and hence sub-wavelength is imaging is not very accurate.

Electromagnetic metamaterials are engineered periodic structures that exhibit physical properties such as a negative refractive index, which is not exhibited by materials that occur in nature. These materials may also be termed as negative index materials (NIM). The electromagnetic lens is generally designed to achieve focus by increasing the gain and decreasing the half-power beamwidth. The lens that is designed using NIMs is different from the lens that is designed using positive index materials (PIMs). Ordinary materials with a positive index need to be curved to function as a lens. One of the key differentiations between them is that a flat lens designed using NIM can be used to focus electromagnetic waves. The property of the negative index enables sub-wavelength high-resolution imaging, which is not possible using a positive index material. NIMs achieve this by picking up and amplifying the decaying evanescent modes that carry information about the near-field. The negative refractive index is achieved by using concentric periodic split-ring resonators (SRRs) of varying sizes and concentric circular trace lines running in the bottom layer, as shown in FIG. 10, (47A) and (47B). This unique design helps to achieve a NIM with a large bandwidth ranging from 0.1 GHz to 10 GHz, preferably between 0.1 GHz to 6 GHz. The SRRs help to achieve the negative permeability, and the concentric trace lines help to achieve the negative permittivity. It can be seen from the radiation patterns (53) and (52) that the gain of the antenna has increased by 3 dB, and the half-power beamwidth has reduced by 40 degrees. FIG. 10, (56) shows the reconstructed image of the metallic bracket (55). It can be seen that the reconstructed image (56) is much clearer compared to the focused image (54) due to the measurement being done with the presence of the metamaterial-based lens.

The testing system and method according to the present invention could achieve the deep penetrative imaging in the microwave frequency range of 0.1 GHz to 10 GHz, preferably between 0.1 GHz to 6 GHz without compromising on the sub-wavelength resolution, by use of the specially designed metamaterial-based planar lens, as described above.

Figure 11:
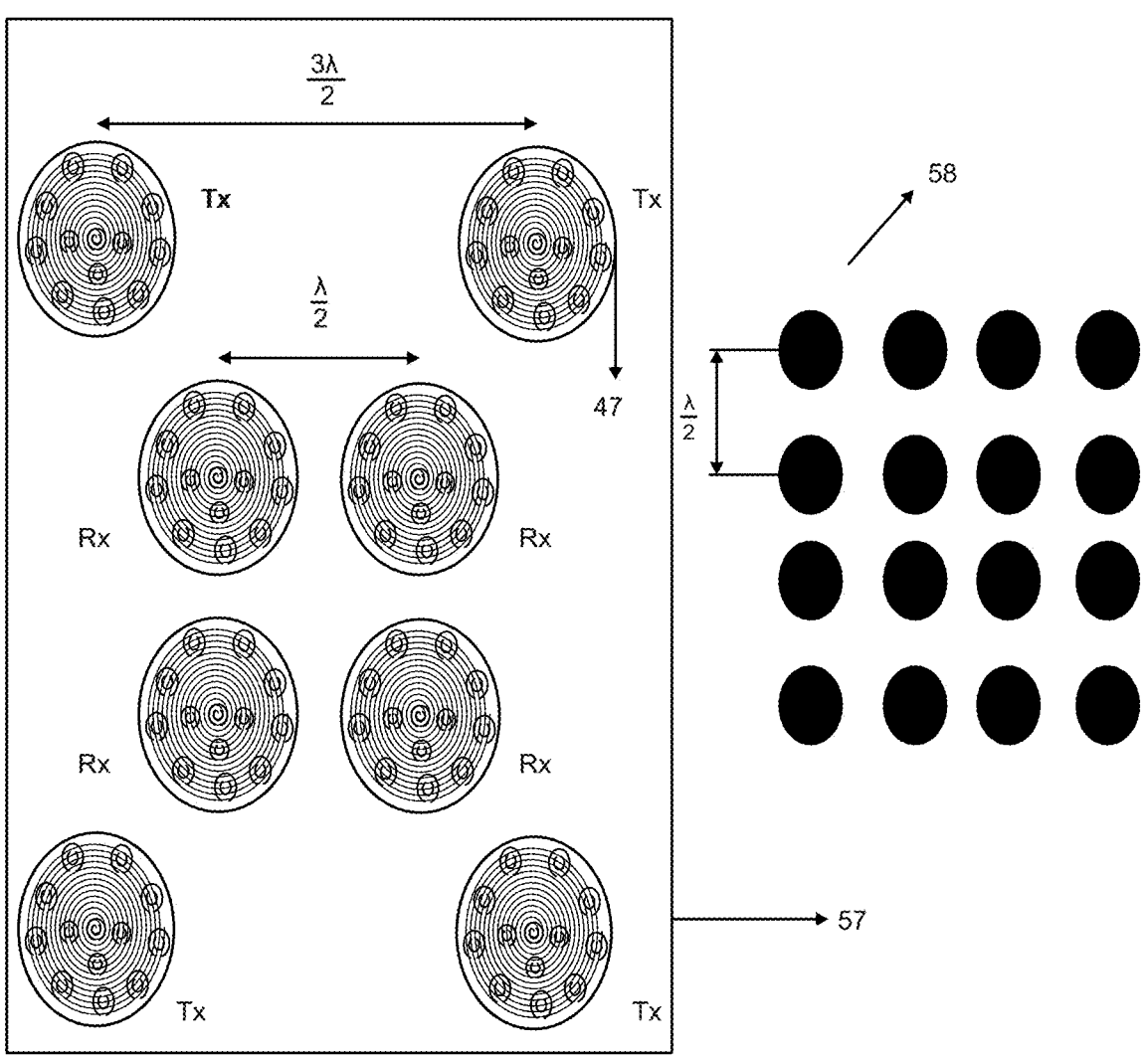
FIG. 11 illustrates an arrangement of four transmitters and four receiver antennas. These transmitters can be used in a time division multiplexed (TDM) scheme leading to a virtual antenna grid of size 4×4.

In a MIMO system, there is an array of antenna elements associated with the transmitters, known as the transmitting (Tx) array, and there is an array of antenna elements associated with the receivers, known as the receiving (Rx) array. The multiplication of the Tx array pattern and the Rx array pattern will result in the equivalent radiation pattern of a MIMO radar. It is well established that the radiation pattern of an array is the Fourier transform of the array distribution. The convolution of the Tx array and Rx array in space will result in a virtual array. The Fourier transform will result in the radiation pattern of the virtual array, which in turn provides the radiation pattern of the MIMO system. Some of the significant parameters that a MIMO system helps to determine to include (but not limited to) the range, velocity, and angle of arrival of an object under inspection. The arrangement of the Rx array, as well as the Tx array, is responsible for the accuracy of the various estimations of the parameters mentioned above. In general, when N antennas are arranged in an equidistant manner in a linear arrangement, then the angular resolution 218) of the MIMO system in the direction along which the antennas are arranged is given by the following expression:

$$\Delta\theta = \frac{\lambda}{Nd}$$

where λ—the operating wavelength. D—the inter-element distance in an equidistant linear array. The expression mentioned above shows that the angular resolution is inversely proportional to the total number of antenna elements in the transmitting section, as well as in the receiver section. A cascaded MIMO system with a large number of Tx and Rx channels will result in a very high angular resolution both in the azimuthal and elevation plane based on the arrangement of the Tx array and the Rx array. The number of Tx and Rx array depends on the frequency ranges selected for the particular application of the testing system. In a frequency range of between 0.1 GHz to 10 GHz, the Tx*Rx elements can be a maximum of 10*10 with a minimum of a single transceiver or a single antenna and receiver. The arrangement of the Tx array and the Rx array in a MIMO configuration can be represented by (57) in FIG. 11. The resulting virtual array is a 16-elements square array as illustrated by (58) in FIG. 11.

Figure 8:
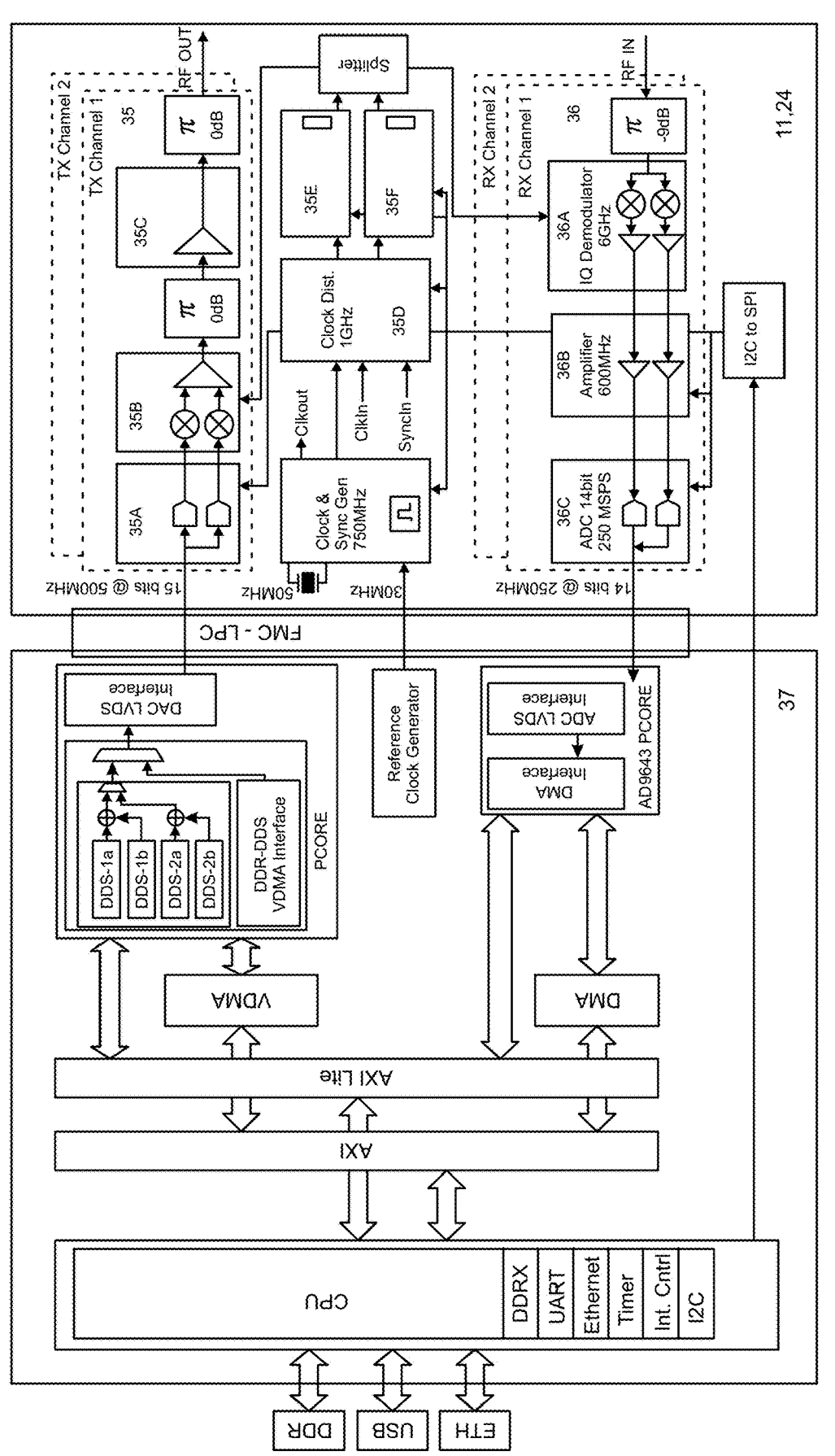
FIG. 8 illustrates the SiP for a monostatic/bistatic radar system according to an embodiment of the testing system disclosed herein.

FIG. 8 depicts a detailed view of the transmitter (35) and receiver (36) block/chain in the system in package (SiP) subsystem (11, 24) according to the present invention. The number of transmitter and receiver blocks is dependent on the application requirement and the required accuracy and resolution of estimated parameters. The transmitter block is composed of 16-bit DAC (35A) that converts the baseband signal from the LVDS interface from field programmable gate array (FPGA) block (37) to an analog signal. The signals from the DAC are input for the IQ modulator, which produces the RF signal operating at any frequency between 0.1 GHz to 10 GHz, preferably between 0.1 GHz to 6 GHz. The frequency is controlled by the SPI interface from (37), which controls (35D), (35E), and (35F). The RF signal is amplified by the RF amplifier block and is inputted to the beam focusing transmitter antennas with a metamaterial lens in the front-end subsystem (10,23). The received RF signal from front-end subsystem is input to the IQ demodulator (36A), which demodulates the signal, and further amplification is performed in (36B) and input to the analog-to-digital converter (ADC) (36C) which is interfaced to the FPGA block (37) through the LVDS interface. In a MIMO configuration, multiple transmitter and receiver blocks will be present with the local oscillator and digital clock synchronized (35D, 35E, 35F).

Figure 12:
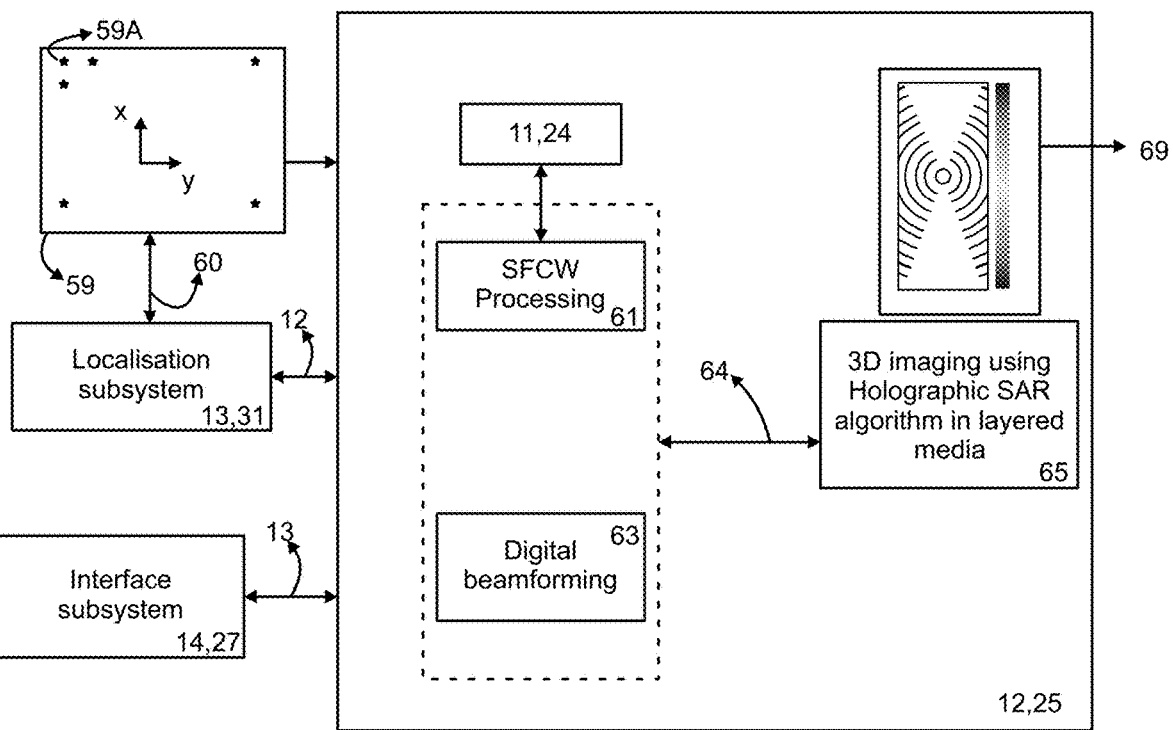
FIG. 12 illustrates data flow and signal processing algorithms for 3D image reconstruction according to an embodiment of the system disclosed herein.
Figure 12:
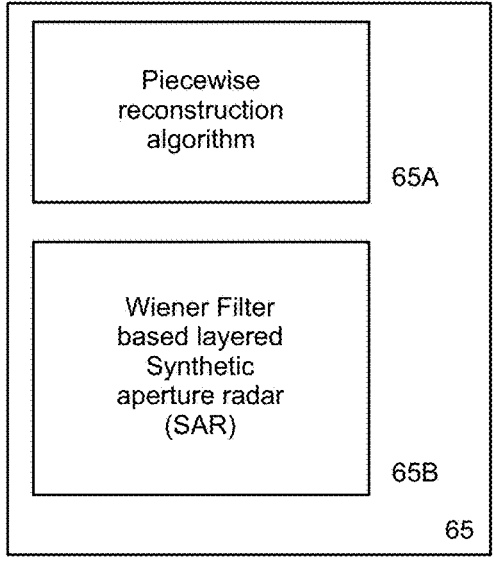
Figure 13:
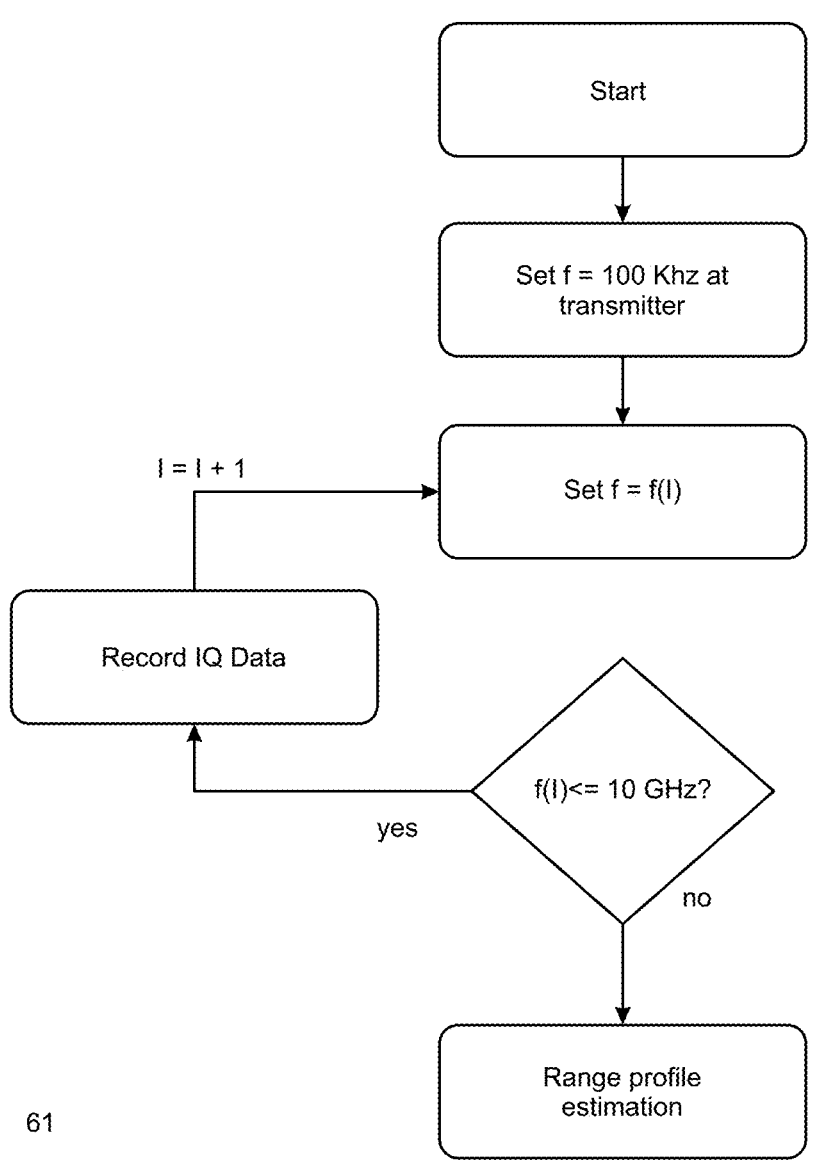
FIG. 13 illustrates a flow chart indicating the steps involved in the process of obtaining range information from the acquired frequency information using the stepped frequency continuous waveform (SFCW).

FIG. 12 and FIG. 13 provides a high-level depiction of the overall testing method and the signal processing subsystem (12) that is responsible for the image reconstruction and data interpretation. At each point in the source aperture, a stepped frequency continuous wave (SFCW waveform) is generated by SiP subsystem (11) and transmitted by the front-end system (10). The frequency is stepped from 0.1 GHz to 6 GHz with a 0.1 MHz step as depicted by FIG. 13, and the data is recorded. The range resolution of a SFCW system, $$R_{res} = \frac{c}{2N f_{step}},$$

where c is the velocity of light, N is total number of frequency steps and $f_{step}$ is the frequency step. Hence for a frequency range extending from 0.1 GHz to 6 GHz, translates to a range resolution of 2.5 cm. Thus, implying that the testing system disclosed herein can differentiate two distinct objects if a distance of at least 2.5 cm separates said objects. One of the key advantages of SFCW based system is that the absolute bandwidth of each channel can be narrow while the overall bandwidth given by $Nf_{step}$ is large. The overall operation of an SFCW system is as follows: (a) the transceiver transmits and receives signals with increasing frequency (one frequency at a time). (b) For each frequency, the received baseband IQ data is recorded. In one embodiment, an inverse Fourier transform (IFFT) can be performed to obtain the range profile.

Figure 14:
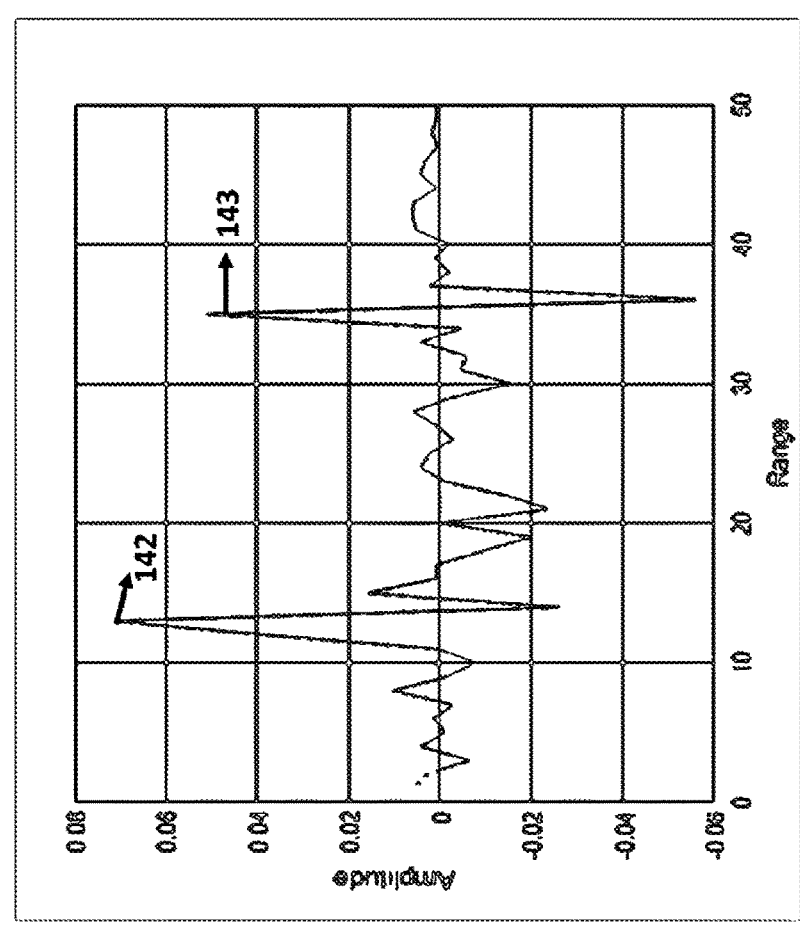
FIG. 14 illustrates sample range profile graphs indicating the presence and type of objects in the area under testing.
Figure 14:
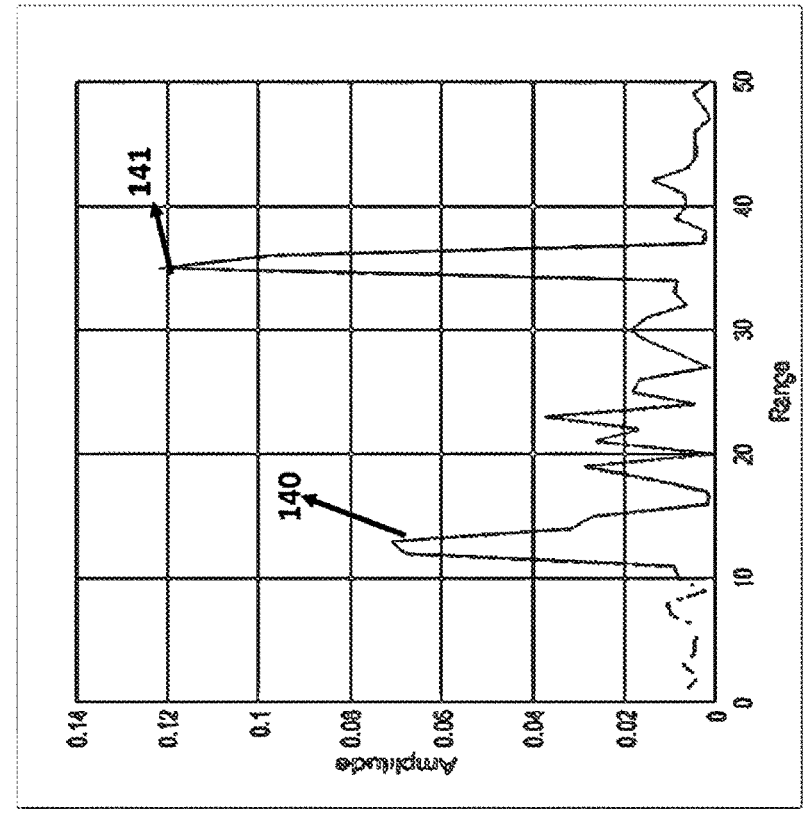
Figure 15:
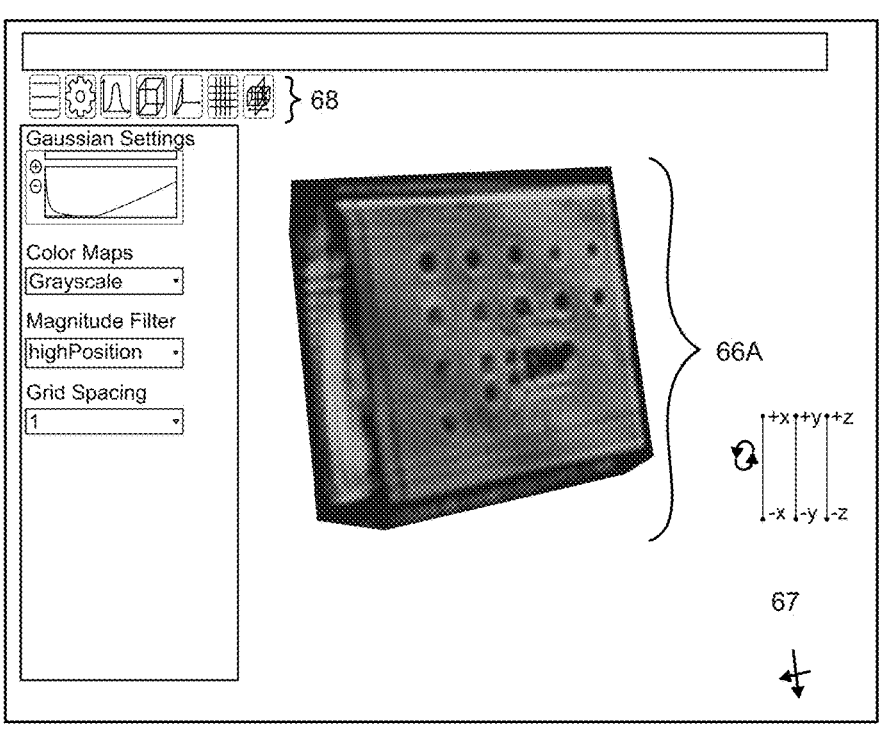
FIG. 15 illustrates a graphical user interface (GUI) for the representation of the 3D imaging according to an embodiment of the system disclosed herein.
Figure 15:
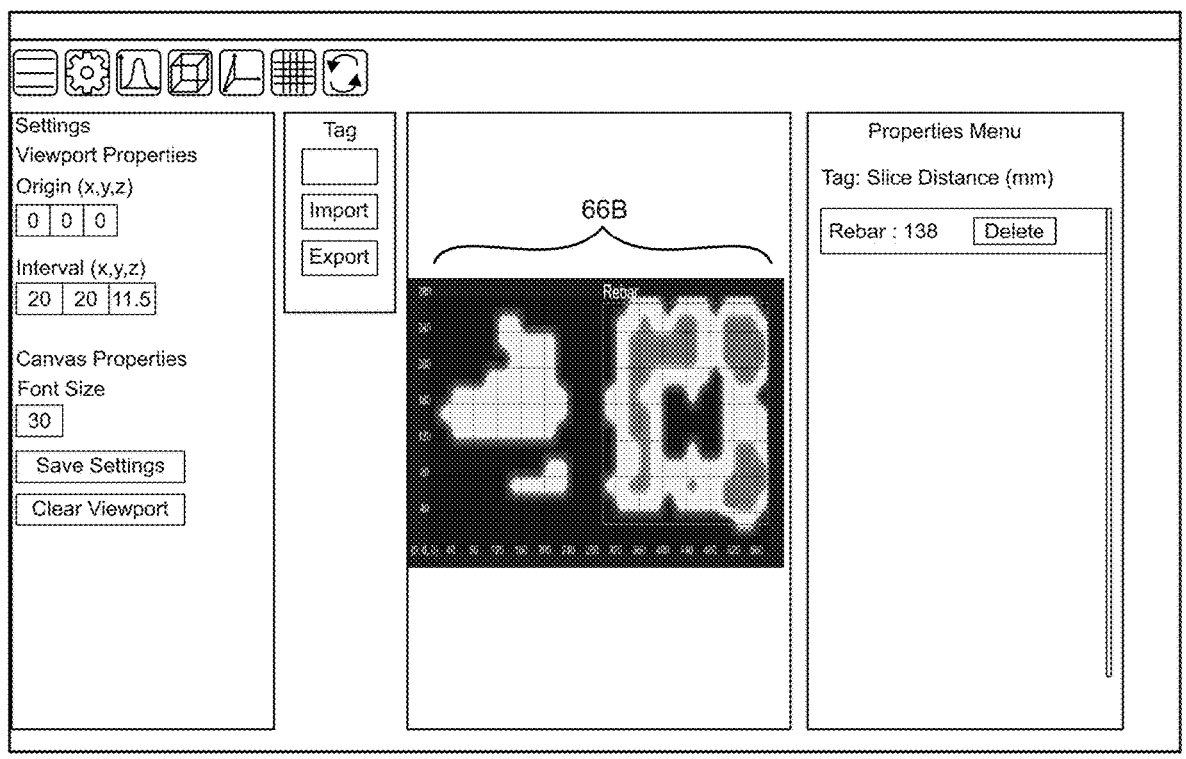

FIG. 14 depicts the range profile obtained when the testing system was used to probe two objects at two different distances. FIG. 14 shows that there are two peaks (140 and 141) corresponding to the two objects. The real part of the range profile can be used to infer the electrical properties of the material based on the characteristics of the obtained waveform (142 and 143).

Figure 9:
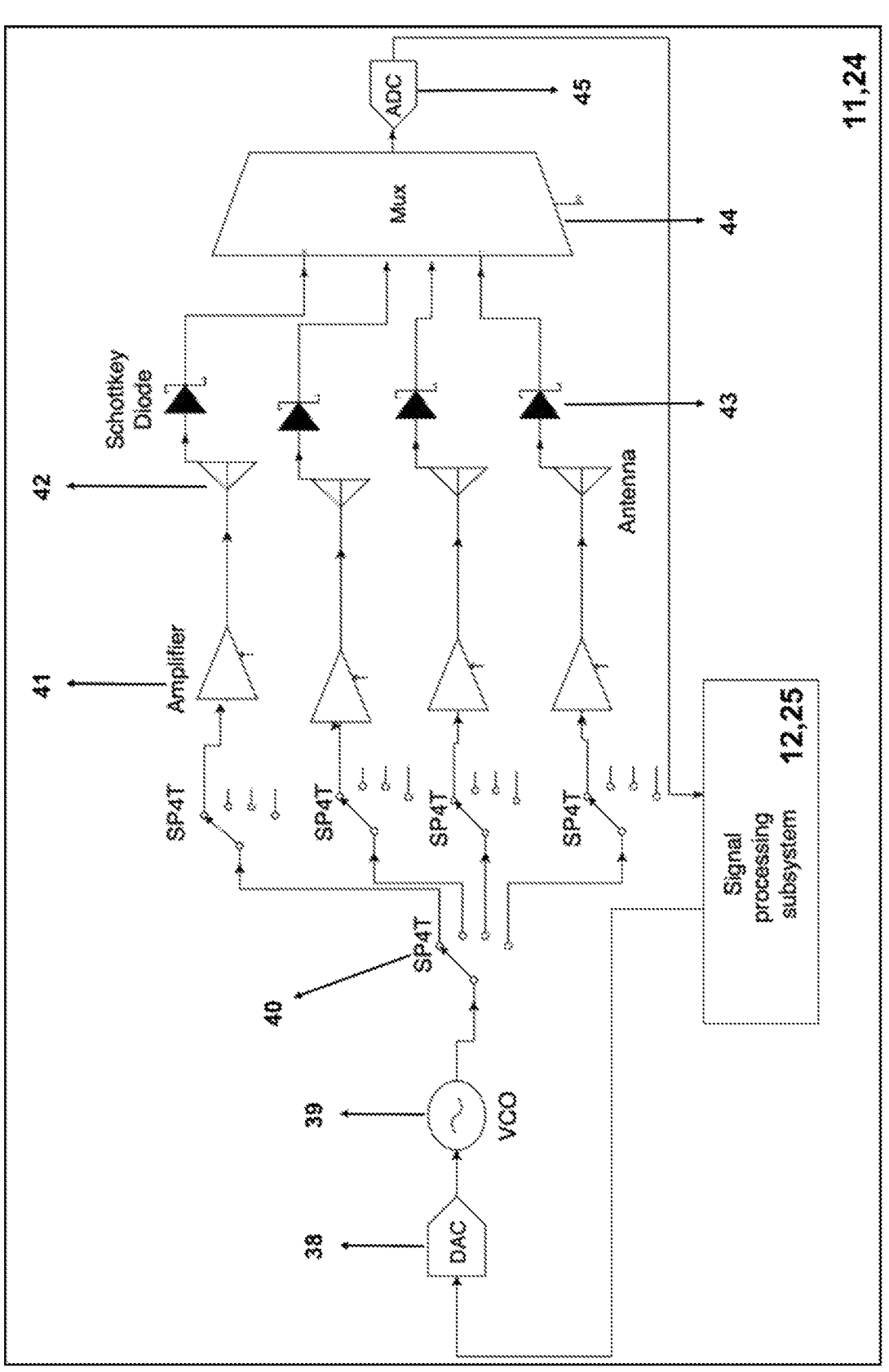
FIG. 9 illustrates the SiP for a monostatic reflectometer array according to another embodiment of the testing system disclosed herein.

In certain embodiments, according to the modalities 1A, 1B, 1C, 1D or 1E the testing system can be moved in the source plane along x and y direction (59) as shown in FIG. 9, to synthesize an aperture that is much larger than the aperture of an individual antenna element or the aperture of the virtual array formed by the MIMO transmitters and receivers. A larger aperture improves the cross-range resolution of the imaging and to obtain a highly focused image. The location of the scanner is computed by the localization subsystem (13). The localization subsystem in 1A and 1B can be implemented using a combination of sensors such as optical flow sensors, inertial measurement unit (IMU), and barometric pressure sensors for accurate localization with a resolution of 0.5 cm or less. In embodiments of 1C, 1D and 1E, the localization subsystem (31) can reside inside the moving platform, such as a drone or a grounded robot/crawler.

Apart from moving the testing system physically to obtain a larger synthetic aperture, digital beam forming techniques (63) can be used. Beam forming is a signal processing technique used in antenna array for directional signal transmission and reception (to steer the beam in an intended direction). There are two major types of beamforming methods: analog beamforming (ABF) method and digital beam forming (DBF) method. In analog beamforming, a single signal is fed to each antenna element in the array by passing through analog phase-shifters where the signal is amplified and directed to the desired receiver. The amplitude/phase variation is applied to the analog signal at the transmit end, where the signals from different antennas are added before the ADC conversion. Digital beam forming is based on the conversion of the RF signal at each antenna element into two streams of binary baseband signals representing cosine and sine channels. These two digital baseband signals can be used to recover both the amplitudes and phases of the signals received at each element of the array. The process of digital beam forming implies weighting by a complex weighting function and then adding together to form the desired output. Beam steering in DBF can be easily achieved by using signal processing techniques in the digital domain, which reduces the need for components utilized in ABF such as phase shifters, time delay lines, and attenuators.

There are a number of different digital beamformers that can be deployed in the system including but not limited to a phase shift beamformer, a minimum variance distortionless (MVDR) beamformer, and a linear constraint minimum variance (LCMV) beamformer. A conventional beamformer delays the received signal at each antenna (delay and sum beamforming). In the case of narrowband, it is equivalent to multiplying the signal at each antenna by a phase factor.

A phase-shift beamformer approximates a time-delay beamformer for narrowband signals by phase-shifting the arriving signal. A phase shift beamformer belongs to the family of conventional beamformers.

A MVDR beamformer is a beamforming method that overcomes the interference problem associated with conventional delay and sum beamforming. This preserves the signal from a particular desired direction and suppresses all the signals coming from other directions. The beamformer weights are calculated by using:

$$w_{MVDR} = \frac{R_n^{-1}a}{a'R_n^{-1}a},$$

where $R_n$ is the noise plus interference covariance matrix.

A LCMV beamformer helps in addressing the self-nulling problem evident in the MVDR scheme. This beamformer allow us to input multiple constraints for desired direction (target direction). The Beamformer weights are calculated by:

$$w_{LCMV} = R_n^{-1}C\left(CR_n^{-1}C'\right)^{-1}d$$

where C is a constraint matrix and d represent the signal gains due to the constraints. The LCMV beamformer algorithm can be used due to its notable benefits. Upon defining a 2D or 3D matrix of element positions (in our case, 2D), the steering angle must be defined. A maximum and minimum limit must be set (in degrees), along with an angular step size, which will increase over each iteration. By defining the steering angle vector, each antenna element will be digitally steered along that angular direction with the given angle step size. A sensor covariance matrix is defined based on the antenna element positions and the maximum acceptable azimuth and elevation angle limits. Once the sensor covariance matrix and the steering vectors are obtained, the gains for the weighting vector can be found. The weighting vector is then multiplied with the received data from each of the virtual channels to obtain the digitally steered backscatter data as provided by using: $P_{DBF}(x,y)=S_L(k_x,k_y)\times w_{LCMV}$.

The recorded frequency spectrum at each point (59A) in the FIG. 12 is combined with the location information from the localization subsystem (13/31) to obtain S(x,y,z,f) where (x,y,z) refers to the source aperture. S(x,y,z,f) represents the raw data or scatter data acquired by the testing system.

In one embodiment according to FIG. 7, the testing system can include the following subsystems:

a beam focusing antenna front-end subsystem (23) comprising a single transceiver. The antenna element operates over a wide frequency range of 0.1 GHz to 10 GHz, preferably between 0.1 GHz to 6 GHz and is integrated with a metamaterial-based lens (47) that enables sub-wavelength, high-resolution imaging;

a monostatic reflectometer array SiP subsystem (24) comprising transmitter and receiver RF chains for generating the stepped frequency continuous waveform in the frequency spectrum ranging from 0.1 GHz to 10 GHz, preferably between 0.1 GHz to 6 GHz;

a digital beamforming signal processing subsystem (25) performing the reconstruction of spatial reflectivity (3D images) of the asset under inspection by employing various backpropagation algorithms suitable for 3 1ulti-layered media and SFCW waveform;

a localization subsystem (31) on a moving platform provides the location information of the system that is useful for the signal processing subsystem 25 to synthesize a large synthetic aperture for 3D image reconstruction;

an interface subsystem (27) responsible for the transfer of the data after signal processing to the cloud server or local tablet PC (15) wherein the visualization of the AUT happens. This visualization can be via a user interface (GUI), where the user (9) can interact with the system by modifying certain interactive elements on said GUI.

In embodiments according to modalities of 1A, 1B, 1C, 1D and 1E, instead of moving the testing system in the source aperture or using digital beamforming, the S(x,y,z,f) may be formed by using a monostatic array of reflectometers (23), (comprised of the antenna elements with metamaterial lens) and an associated reflectometer SiP (24). In the context of the system disclosed herein, the reflectometers refer to a transmitting radar antenna element with a Schottky diode incorporated therewith.

The monostatic array of reflectometers (23) and associated reflectometer SiP (24) are illustrated in FIG. 7, which is an alternate high-level architecture for the non-contact microwave testing system. Each individual element in the monostatic array can comprise of an antenna element with metamaterial lens (47) arranged in a rectangular array configuration. Instead of using a typical homodyne/heterodyne transceiver architecture, the output is directly taken from the aperture of the antenna as shown by (47C) in FIG. 10. The output can be phase referenced by integrating a zero-biased Schottky diode (43) at the aperture of the antenna. In this case, there is no external phase-referencing required.

The monostatic reflectometer array SiP subsystem (24) according to the embodiment of FIG. 7 can be implemented as shown in FIG. 9. In FIG. 9, the SiP subsystem (11, 24) can be composed of a digital to analog converter (DAC) controlled by the signal processing subsystem (12, 25). The DAC is used to control the voltage-controlled oscillator (VCO) (39). A multitude of SP4T switches (40) can be used to switch to the different elements in the antenna array (42). The Schottky diode (43) mixes the transmitted and reflected signal in order to yield real-valued outputs that are routed through the multiplexer (44) and sampled by the analog to digital converter (ADC) (45) and input to the signal processing subsystem (25). S(x,y,z,f) where (x,y,z) refers to the source aperture, is captured in a single shot in such an architecture as the real valued outputs captured by the ADC (45) at various frequencies controlled by the VCO (39).

In all embodiments of the system disclosed herein, objects in front of the system can be assumed to be composed of many point targets. If a point target is at a location (x',y',z'), the reflectivity (qualitative image) function $\tau(x',y',z',f)$ is related to the recorded frequency spectrum and the property of the medium indicated by the round trip dyadic green functions (DGFs), $G_{RT}(x,y,z;x',y',z',f)$. The relation is provided by:

$$S(x,y,z,f)=\tau(x',y',z',f)\times G_{RT}(x,y,z;x',y',z',f)$$

$$G_{RT}(x,y,z;x',y',z',f) \text{ of a medium is given by}$$

$$G_{RT}(r;r',f)=G_R(r;r',f)*G_R(r';r,f), \text{ where } r=(x,y,z) \text{ and } r'=(x',y',z').$$

In air medium, the reflectivity function can be calculated using the following procedure:

a) 2D fast Fourier transform (FFT) of S(x,y,z,f) is calculated as $S(k_x,k_y,z,f)$. The wavenumber, k, is related to the frequency, f, by using the relation:

$$k = \frac{c}{f}$$

b) Phase compensation is performed by matched filtering by multiplying $S(k_x,k_y,k_z,f)$ with $e^{jk_zz'}$ where $$k_z^2 = 4k^2 - k_x^2 - k_y^2$$

resulting in a $P(k_x,k_y,z',f)=S(k_x,k_y,k_z,f)\times e^{jk_zz'}$ c) The inverse fast Fourier transform (IFFT) is computed for $P(k_x,k_y,z',f)$ and a sum is performed over all the frequencies to yield the reflectivity function $$\tau(x', y', z') = \sum_f \left( F_{xy}^{-1}(P(k_x, k_y, z', f)) \right).$$

This procedure can be repeated for different values of $z'$ in order to determine the reflectivity function of the scene in front of the testing system.

The whole procedure of image reconstruction can be condensed by the following equation:

$$\tau(x', y', z' = 0 \text{ to } z'_{max}) = \sum_f F_{xy}^{-1} \left( S(k_x, k_y, k_z, f) \times e^{jk_z(z'=0 \text{ to } z'_{max})} \right).$$

However, in a real imaging scenario, the medium is a layered medium consisting of multiple layers. In a stratified layered media, the electromagnetic waves behave differently when compared to a homogenous media. In case of a layered medium, the algorithm has to be modified to be suitable for the layered medium. In certain embodiments, two modified algorithms can be used for the reconstruction of the reflectivity function $$\tau(x', y', z' = 0 \text{ to } z'_{max}).$$

In one embodiment of 65: 65A, an additional phase can be added to the collected frequency spectrum in a piecewise manner, one layer at a time, in order to focus on a particular layer $$z' = 0 \text{ to } z'_{max}$$

This method can include the electrical, magnetic and physical properties of the different layers. The equation governing the focus on an object in a layer M at $$z' = 0 \text{ to } z'_{max}$$

from the source aperture at z=0 in spectral domain is given by:

$$\tau(k_x, k_y, z', f) =$$

-continued $$S(k_x, k_y, z, f) \times e^{jk_z^1(-d_1-z)} \times \prod_{i=1}^{M-2} \left( e^{jk_z^i(d_i-d_{i+1})} \right) \times e^{jk_{z,M}(z'+d_{M-1})}$$

where $d_i$ indicates the distance value of the interface that separates the layers 1 and $$i+1, \left(k_z^i\right)^2 = 4k_i{}^\wedge 2 - k_x^2 - k_y^2, k_i = \frac{c}{f*\left(\epsilon_r^i\right)^{0.5}}$$

and $$\epsilon_r^i$$

is the permittivity of the layer i.

The overall procedure of the piecewise algorithm can be condensed using the following expression:

$$\tau(x', y', z' = 0 \text{ to } z_{max}) =$$
$$\sum_f F_{xy}^{-1} \left( S(k_x, k_y, z, f) \times e^{jk_z^1(-d_1-z)} \times \prod_{i=1}^{M-2} \left( e^{jk_z^i(d_i-d_{i+1})} \right) \times e^{jk_{z,M}(z'+d_{M-1})} \right).$$

However, the above model does not consider the discontinuity between the different layers. In order to account for this discontinuity, the Fresnel transmission coefficients can be used. The Fresnel transmission coefficients, $T_{i,i+1}$ from layer 1 and i+1 are provided by the expression, $$T_{i,i+1} = \frac{2\epsilon_{(i+1)}k_z^i}{\epsilon_{(i)}k_z^{i+1} + \epsilon_{(i+1)}k_z^i}.$$

The final expression for the 3D image reconstruction using the piecewise incorporation of the phase changes in each layer and the incorporation of the Fresnel coefficients to incorporate the discontinuity of the different layers is given by:

$$\tau(x', y', z' = 0 \text{ to } z_{max}) = \sum_f F_{xy}^{-1} ((S(k_x, k_y, z, f) \times e^{jk_z^1(-d_1-z)} \times$$
$$\prod_{i=1}^{M-2} \left( e^{jk_z^i(d_i-d_{i+1})} \right) \times e^{jk_{z,M}(z'+d_{M-1})}) \frac{1}{\prod_i^{M-1} \left( e^{-j\bot T_{i,i+1}} \right) \left( e^{-j\bot T_{i+1,i}} \right)},$$

The algorithm 65A does not take into account the multiple reflections and attenuation by the different layers. In order to incorporate the attenuation and different properties of the layers, DGF of the stratified layered medium can be used 65B. The recorded frequency spectrum over the source aperture, $S(x,y,z,f)$, is related to the reflectivity function $\tau(x,y,z,x',y',z',f)$, and the round trip DGF of the layered stratified medium, $G_{RT}(x,y,z;x',y',z',f)$ by the expression:

$$S(x,y,z,f)=T(x',y',z',f)*G_{RT}(x,y,z;x',y',z',f)+v(x,y,z,f)$$

where $v(x,y,z,f)$ is the additive noise.

The deconvolution in order to determine the reflectivity function can be performed by using the expression:

$$\tau(x', y', z', f) = F_{xy}^{-1}\{((G_{RT})^H \cdot S(k_x, k_y, k_z, f))/((G_{RT} \cdot G_{RT}^H) + \delta^2)\}$$

where $\delta^2 = \alpha |G_{RT}(k_x,k_y,z,f)|^2_{max}$ and $\alpha$ can vary from $10^{-10}$ to $10^{-20}$. The dyadic green functions can be determined using the expression:

$$G_{RT} = G_p^2 = \left(F_{xy}^{-1}\left(\frac{F_{TM}(k_x, k_y, k_z, z, z')}{k_{mz}}\right)\right)^2.$$

The 3D reconstructed image from the signal processing subsystem 12/25 can be input to the interface subsystem, 14/27 which might be a wired interface. In one embodiment, the interface subsystem 14/27 is implemented using ethernet interface and USB interface. In one embodiment, the interface subsystem 14/27 is implemented using Bluetooth (or) Zigbee (or) WiFi (or) LTE. In certain implementations, 14/27 transfers the data directly to a tablet/PC wherein an application that resides in the PC/workstation is used to visualize the reflectivity function $$\tau(x', y', z' = 0 \text{ to } z'_m).$$

In one embodiment, the interface subsystem 14/27 transfers the data to a cloud server. The data can be accessed by using a web application in any computing system including but not exclusive to workstation/PC, tablet PC and mobile phone remotely 15.

FIG. 12 shows a certain embodiment of the visualization of the 3D reflectivity function $$\tau(x', y', z' = 0 \text{ to } z'_m).$$

The data computed by the signal processing subsystem 12/25 is loaded and visualized as a 3D cube 66A. A slider 67 enables the visualization of any required slice along x-axis, y-axis and z-axis. In another embodiment, the visualization of the recorded reflectivity function is performed as a 3D voxel to provide a real-life representation of the recorded data. In one embodiment, there is provided tools 68 for manipulation such as change of color scheme, introduction of grid lines, introduction of axis, changing the perspectives/views of the 3D cube. In one embodiment, there is provided a means 66B of visualization in 2D view and manual embedded object tagging. In one embodiment, there is provided a means 66B of manual tagging of defects that are identified from the data. In another embodiment, there is provided a means 66B of automated tagging of embedded objects that are identified from the data by the AI-based algorithms running in the background. In another embodiment, there is provided a means 66B of automated tagging of embedded defects that are identified from the data by the AI-based algorithms running in the background.

The various subsystems in the exemplified architectures shown in FIG. 6 and FIG. 7 can be implemented for the different modalities 1A, 1B, 1C, 1D and 1E. The overall operation of the different modalities is explained as follows.

In the embodiment of 1A (hand-held non-contact microwave testing system), the system can be comprised of beam focusing antenna front-end subsystem 23 with a single transceiver. 1A can be equipped with a localization subsystem 13 which can provide accurate coordinates for processing using a signal processing subsystem 12. 1A can be moved over an area in a non-uniform manner and the recorded data is fused with the coordinate information from the localization subsystem 13 to obtain S(x,y,z,f). The signal processing subsystem 12 can be used to reconstruct the reflectivity function $$\tau(x', y', z' = 0 \text{ to } z'_m).\ \tau(x', y', z' = 0 \text{ to } z'_m)$$

from signal processing subsystem 12 can be routed by interface subsystem 14 to the cloud server or local tablet PC 15 and visualized by the GUI explained above and the user 17 can view the GUI and perform data interpretation.

In one embodiment of 1A, the system can be comprised of a MIMO front-end subsystem 10 with multiple transceivers and the associated SiP subsystem 11. 1A can be moved over an area in a fast non-uniform motion (since the larger number of antennas formed by the virtual cover a larger aperture in a single shot) and the recorded data is fused with the coordinate information from localization subsystem 13 to obtain S(x,y,z,f). The signal processing subsystem 12 can be used to reconstruct the reflectivity function $$\tau(x', y', z' = 0 \text{ to } z'_m).\ \tau(x', y', z' = 0 \text{ to } z'_m)$$

from the signal processing subsystem 12 can be routed by interface subsystem 14 to the cloud server or local tablet PC 15 and visualized by the GUI explained above and the user 17 can view the GUI and perform data interpretation.

In one embodiment of 1A, the front-end subsystem can be implemented as a monostatic array of reflectometers 47C and the associated SiP subsystem 24. S(x,y,z,f) can be captured in one shot without moving the scanner. The signal processing subsystem 12 can be used to reconstruct the reflectivity function $$\tau(x', y', z' = 0 \text{ to } z'_m).\ \tau(x', y', z' = 0 \text{ to } z'_m)$$

from the signal processing subsystem 12 can be routed by interface subsystem 14 to the cloud server or local tablet PC 15 and visualized by the GUI explained previously and the user 17 can view the GUI and perform data interpretation.

In the embodiment according to 1B (hand-held, non-contact testing system with wheels), the system can be comprised of beam focusing antenna front-end subsystem 23 with a single transceiver. 1B can be equipped with a localization subsystem 13 which can provide accurate coordinates for processing using signal processing subsystem 12. 1B can be moved over an area in a uniform manner (since the scanner has wheels) and the recorded data is fused with the coordinate information from localization subsystem 13 to obtain S(x,y,z,f). The signal processing subsystem 12 can be used to reconstruct the reflectivity function $$\tau(x', y', z' = 0 \text{ to } z'_m).\ \tau(x', y', z' = 0 \text{ to } z'_m)$$

from the signal processing subsystem 12 can be routed by interface subsystem 14 to the cloud server or local tablet PC 15 and visualized by the GUI explained previously and the user 17 can view the GUI and perform the data interpretation.

In one embodiment of 1B, the scanner can be comprised of a MIMO front-end subsystem 10 with multiple transceivers and the associated SiP subsystem 11. 1B can be moved over an area in a uniform motion with larger steps implying faster scanning (since the larger number of antennas formed by the virtual cover a larger aperture in a single shot) and the recorded data is fused with the coordinate information from localization subsystem 13 to obtain S(x,y,z,f). The signal processing subsystem 12 can be used to reconstruct the reflectivity function $$\tau(x', y', z' = 0 \text{ to } z'_m). \ \tau(x', y', z' = 0 \text{ to } z'_m)$$

from the signal processing subsystem 12 can be routed by interface subsystem 14 to the cloud server or local tablet PC 15 and visualized by the GUI explained previously and the user 17 can view the GUI and perform data interpretation.

In one embodiment of 1B, the frontend subsystem can be implemented as a monostatic array of reflectometers 47C and the associated SiP subsystem 24. S(x,y,z,f) can be captured in one shot without moving the scanner. The signal processing subsystem 12 can be used to reconstruct the reflectivity function $$\tau(x', y', z' = 0 \text{ to } z'_m). \ \tau(x', y', z' = 0 \text{ to } z'_m)$$

from the signal processing subsystem 12 can be routed by interface subsystem 14 to the cloud server or local tablet PC 15 and visualized by the GUI explained previously and the user 17 can view the GUI and perform the data interpretation.

In the embodiments according to 1C (the testing system mounted on a drone), the system can comprise of a beam focusing antenna frontend subsystem 23 with a single transceiver. 1C can determine the coordinates from the localization subsystem 31 in the drone, which can provide accurate coordinates for processing using the signal processing subsystem 25. 1C can be moved over an area in a uniform manner or preplanned and the recorded data is fused with the coordinate information from localization subsystem 31 to obtain S(x,y,z,f). The signal processing subsystem 25 can be used to reconstruct the reflectivity function $$\tau(x', y', z' = 0 \text{ to } z'_m). \ \tau(x', y', z' = 0 \text{ to } z'_m)$$

from the signal processing subsystem 25 can be routed by interface subsystem 27 to the cloud server or local tablet PC 15 and visualized by the GUI explained previously and the user 17 can view the GUI and perform data interpretation.

In one embodiment of 1C, the system can comprise a MIMO frontend subsystem 10 with multiple transceivers and the associated SiP subsystem 11. 1C can be moved over an area in a uniform motion with larger steps implying faster scanning (since the larger number of antennas formed by the virtual cover a larger aperture in a single shot) and the recorded data is fused with the coordinate information from localization subsystem 31 to obtain S(x,y,z,f). The signal processing subsystem 12 can be used to reconstruct the reflectivity function $$\tau(x', y', z' = 0 \text{ to } z'_m). \ \tau(x', y', z' = 0 \text{ to } z'_m)$$

from the signal processing subsystem 12 can be routed by interface subsystem 14 to the cloud server or local tablet PC 15 and visualized by the GUI explained previously and the user 17 can view the GUI and perform data interpretation.

In one embodiment of 1C, the frontend subsystem can be implemented as a monostatic array of reflectometers 47C and the associated subsystem 24. S(x,y,z,f) can be captured in one shot without moving the scanner. The signal processing system 12 can be used to reconstruct the reflectivity function $$\tau(x', y', z' = 0 \text{ to } z'_m). \ \tau(x', y', z' = 0 \text{ to } z'_m)$$

from the signal processing subsystem 12 can be routed by interface subsystem 14 to the cloud server or local tablet PC 15 and visualized by the GUI explained previously and the user 17 can view the GUI and perform the data interpretation.

In the embodiment of 1D and 1E (the testing system mounted on robotic arm/crawler), the system can comprise a beam focusing antenna frontend subsystem 23 with a single transceiver. 1D can determine the coordinates from the localization subsystem 31 in the robotic arm which can provide accurate coordinates for processing using the signal processing system 25. 1D and 1E can be moved over an area in a uniform manner or preplanned and the recorded data is fused with the coordinate information from localization subsystem 31 to obtain S(x,y,z,f). The signal processing subsystem 25 can be used to reconstruct the reflectivity function $$\tau(x', y', z' = 0 \text{ to } z'_m). \ \tau(x', y', z' = 0 \text{ to } z'_m)$$

from the signal processing subsystem 25 can be routed by interface subsystem 27 to the cloud server or local tablet PC 15 and visualized by the GUI explained previously and the user 17 can view the GUI and perform data interpretation.

In one embodiment of 1D and 1E, the scanner can comprise a MIMO frontend subsystem 10 with multiple transceivers and the associated SiP subsystem 11. 1D and 1E can be moved over an area in a uniform motion with larger steps implying faster scanning (since the larger number of antennas formed by the virtual cover a larger aperture in a single shot) and the recorded data is fused with the coordinate information from the localization subsystem 31 to obtain S(x,y,z,f). The signal processing subsystem 12 can be used to reconstruct the reflectivity function $$\tau(x', y', z' = 0 \text{ to } z'_m). \ \tau(x', y', z' = 0 \text{ to } z'_m)$$

from the signal processing subsystem 12 can be routed by the interface subsystem 14 to the cloud server or local tablet PC 15 and visualized by the GUI explained previously and the user 17 can view the GUI and perform data interpretation.

In one embodiment of 1D and 1E, the front-end subsystem can be implemented as a monostatic array of reflectometers 47C and the associated SiP subsystem 24. S(x,y,z,f) can be captured in one shot without moving the scanner. The signal processing subsystem 12 can be used to reconstruct the reflectivity function $$\tau(x',\, y',\, z' = 0 \text{ to } z'_m).\; \tau(x',\, y',\, z' = 0 \text{ to } z'_m)$$

from the signal processing subsystem 12 can be routed by the interface subsystem 14 to the cloud server or local tablet PC 15 and visualized by the GUI explained previously and the user 17 can view the GUI and perform data interpretation.

Figure 16:
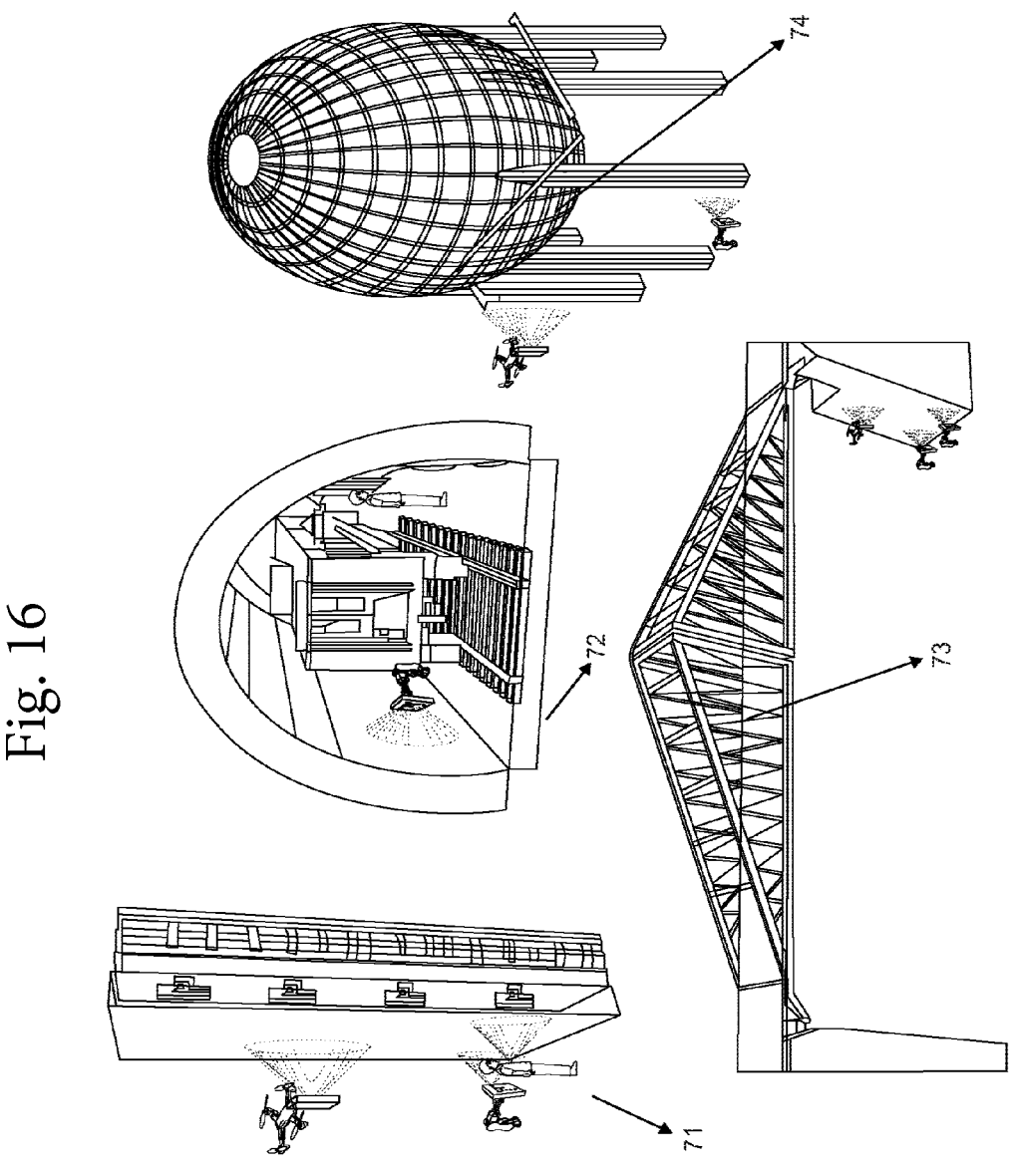
FIG. 16 illustrates different infrastructure use cases and application scenarios where the testing system disclosed herein can be used.

The different modalities 1A, 1B, 1C, 1D and 1E can be used for inspection of buildings, as shown by 71 in FIG. 16. The system can be deployed for the inspection of tunnels, as shown in 72. The scanning solution is deployed for the inspection of bridges, as shown in 73. The system can be deployed for inspection on legs of spherical tanks/containers as shown in 74. The applications are not limited to the aforementioned use cases and may include a diverse applications of this technology in NDT market.

Having now described some illustrative embodiments, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method steps or apparatus elements, it should be understood that those steps and those elements may be combined in other ways to accomplish the same objectives. Steps, elements and features discussed only in connection with one embodiment are not intended to be excluded from a similar role in other embodiments.

What is claimed is:

1. A non-contact microwave testing system for see-through imaging of an area under testing, comprising:
   a front-end subsystem configured to transmit and receive electromagnetic waves to and from the area under testing, wherein the front-end subsystem comprises at least one transmitter antenna and at least one receiver antenna, wherein the at least one transmitter antenna and the at least one receiver antenna are integrated with a metamaterial-based lens that includes a plurality of concentric periodic split-ring resonators (SRRs) of varying sizes and concentric circular trace lines running in the bottom layer of the lens, wherein the metamaterial-based lens is made from double negative materials (DNG) having the property of negative index to enable sub-wavelength high-resolution imaging;
   a System in Package (SiP) subsystem comprising transmitter and receiver radio frequency (RF) chains, wherein the SiP subsystem generates a stepped frequency continuous wave (SFCW) waveform for non-destructive testing of heterogeneous multi-layered media, including concrete, brick and mortar, ceramic facade, stone claddings, and glass facades;

a signal processing subsystem configured to perform reconstruction of spatial reflectivity of heterogeneous multi-layered media in the area under testing, by:
   obtaining wideband frequency domain data S(x, y, z, f) over a source aperture, wherein (x,y,z) represent spatial coordinates and f represents frequency;
   reconstructing the spatial reflectivity using at least one of:
      piecewise phase addition for each of a plurality of layers of the multi-layered media, wherein an additional phase is added to a collected frequency spectrum in a piecewise manner, one layer at a time, for 3D imaging of the area under testing, including Fresnel transmission coefficients between the layers, or
      deconvolution using dyadic Green's functions of the multi-layered media to include a plurality of reflections and a plurality of attenuations by the plurality of layers, wherein the reconstructed spatial reflectivity provides amplitude and phase components for each x, y, z coordinate for 3D quantitative imaging, including parameters of permittivity and conductivity; and
   generating a three-dimensional (3D) image of the area under testing based on the reconstructed spatial reflectivity;
   a localization subsystem configured to provide location information for synthesizing a synthetic aperture for the generated 3D image;
   an interface subsystem configured to transfer visualization data of the generated 3D image of the area under testing;
   wherein the non-contact microwave testing system is configured to achieve a penetration depth of at least 0.20 m in non-metallic materials and differentiate two distinct objects if a distance of at least 0.01 m separates them,
   wherein the non-contact microwave testing system is configured to operate in a frequency range from 0.1 GHz to 10 GHz.

2. The system of claim 1, wherein the front-end subsystem comprises at least one transceiver.

3. The system of claim 1, wherein the signal processing subsystem comprises backpropagation algorithms for reconstruction of spatial reflectivity of the multi-layered media using the SFCW waveform.

4. The system of claim 1, wherein the localization subsystem comprises optical flow sensors, an inertial measurement unit (IMU), and barometric pressure sensors.

5. The system of claim 1, wherein the interface subsystem transfers data from the signal processing subsystem to a cloud server or a local tablet personal computer (PC) for reconstruction of the high-resolution image.

6. The system of claim 1, wherein the front-end subsystem is a beam focusing multiple-input-multiple-output (MIMO) front-end subsystem comprising an array of transmitter antennas that are time-division multiplexed and an array of receiver antennas forming a virtual antenna array based on the physical arrangement of the transmitter and receiver antennas;
   wherein the SiP subsystem is a MIMO SiP subsystem comprising the transmitter and receiver RF chains for generating the stepped frequency continuous wave (SFCW) waveform; and, wherein the localization subsystem provides location information of the system for the signal processing subsystem to synthesize a synthetic aperture for 3D image reconstruction.

7. The system of claim 1, wherein the front-end subsystem is a beam focusing antenna front-end subsystem comprising a single transceiver;

wherein the signal processing subsystem is a digital beamforming signal processing subsystem;

wherein the localization subsystem is deployed on a moving platform and provides the system's location information for the signal processing subsystem to synthesize a synthetic aperture for 3D image reconstruction.

8. The system of claim 1, wherein the metamaterial-based lens contains concentric periodic split-ring resonators (SRRs) of varying sizes and concentric circular trace lines running in a bottom layer of the lens.

9. The system of claim 1, wherein the metamaterial-based lens is placed on top of the at least one transmitter antenna and the at least one receiver antenna for non-penetrative scanning at a distance greater than a wavelength of the electromagnetic waves.

10. The system of claim 1, wherein the system is configured to be hand-held, mounted/fixed on a payload-carrying, autonomous/semi-autonomous/controlled system selected from an unmanned ground vehicle (UGV), a drone, a robotic arm, a crawler robot and/or a combination thereof for non-destructive inspection of facilities including facade structures, cladding systems, concrete pillars and walls, indoor mechanical, electrical and plumbing (MEP) fittings, water, oil and gas pipelines, metallic parts, roads, tree trunks, tunnels, dams, bridges, medical imaging, security surveillance and warehouse sorting.

11. The system of claim 10, wherein the system is configured to be hand-held, and wherein the front-end subsystem comprises:

a single input single output (SISO) configuration including a single transmitting and receiving wideband antenna element;

a monostatic array of antenna elements; or a MIMO array of antenna elements.

12. The system of claim 10, wherein the system is mounted/fixed on a payload-carrying, autonomous/semi-autonomous/controlled system selected from an unmanned ground vehicle (UGV), drone, robotic arm and crawler robot, and wherein the front-end subsystem comprises:

a beam focusing antenna subsystem with a single transceiver;

a MIMO subsystem with multiple transceivers; or a monostatic array of reflectometers.

13. A method for non-contact see-through imaging of an area under testing, the method comprising the steps of:

generating electromagnetic waves by a System-in-Package (SiP) subsystem, wherein a stepped frequency continuous wave (SFCW) waveform is generated by the SiP subsystem for non-destructive testing of heterogeneous multi-layered media, including concrete, brick and mortar, ceramic facade, stone claddings, and glass facades;

transmitting the generated electromagnetic waves to a front-end subsystem through an RF interface, wherein the front-end subsystem comprises at least one transmitter antenna and at least one receiver antenna, wherein the at least one transmitter antenna and the at least one receiver antenna are integrated with a metamaterial-based lens that includes a plurality of concentric periodic split-ring resonators (SRRs) of varying sizes and concentric circular trace lines running in the bottom layer of the lens, wherein the metamaterial-based lens is made from double negative materials (DNG) having the property of negative index to enable sub-wavelength high-resolution imaging;

transmitting and receiving backscattered signals to the front-end subsystem from the area under testing;

routing received RF signals to a signal processing subsystem by the SiP subsystem for signal processing and reconstruction of spatial reflectivity of heterogeneous multi-layered media in the area under testing, wherein the reconstruction of spatial reflectivity comprises:

obtaining, by the signal processing subsystem, wideband frequency domain data $S(x, y, z, f)$ over a source aperture, wherein $(x, y, z)$ represent spatial coordinates, and $f$ represents frequency;

reconstructing, by the signal processing subsystem, the spatial reflectivity using at least one of:

piecewise phase addition for each of a plurality of layers of the multi-layered media, wherein an additional phase is added to a collected frequency spectrum in a piecewise manner, one layer at a time, for 3D imaging of the area under testing, including Fresnel transmission coefficients between the layers, or deconvolution using dyadic Green's functions of the multi-layered media to include a plurality of reflections and a plurality of attenuations by the plurality of layers, wherein the reconstructed spatial reflectivity provides amplitude and phase components for each x, y, z coordinate for 3D quantitative imaging, including parameters of permittivity and conductivity;

generating a three-dimensional (3D) image of the area under testing based on the reconstructed spatial reflectivity, wherein the generation of the 3D image comprises combining data from the SiP subsystem and a localization subsystem by the signal processing subsystem to perform 3D image reconstruction and data interpretation schemes, wherein the localization subsystem provides location information for synthesizing a synthetic aperture for the generated 3D image, and wherein the 3D image reconstruction and which is routed to an interface subsystem; and routing the data interpretation schemes and a reconstructed 3D image by the interface subsystem through wired or wireless transmission to a cloud server or a local tablet personal computer (PC) for a user to visualise the image of the area under testing, wherein the method achieves a penetration depth of at least 0.20 m in non-metallic materials and differentiates two distinct objects if a distance of at least 0.01 m separates them, and wherein the method operates in a frequency range from 0.1 GHz to 10 GHz.

14. The method of claim 13, wherein the backscattered signals from the area under testing are directly sampled at an aperture of the front-end subsystem, by a reflectometer utilizing a Schottky diode at an aperture of an antenna with a metamaterial-based lens.

15. The method of claim 13, wherein a dead reckoning algorithm for an inertial measurement unit (IMU) is combined with an optical flow sensor, for retrieving accurate coordinate information from the localization subsystem.

* * * * *